(12) United States Patent
Wada

(10) Patent No.: US 7,757,092 B2
(45) Date of Patent: Jul. 13, 2010

(54) DATA OUTPUT APPARATUS

(75) Inventor: Masahiro Wada, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1081 days.

(21) Appl. No.: 10/985,300

(22) Filed: Nov. 9, 2004

(65) Prior Publication Data
US 2005/0102518 A1 May 12, 2005

(30) Foreign Application Priority Data
Nov. 12, 2003 (JP) ............................. 2003-383095

(51) Int. Cl.
*G06F 21/00* (2006.01)
(52) U.S. Cl. ..................................... 713/182
(58) Field of Classification Search ................ 713/182
See application file for complete search history.

(56) References Cited

U.S. PATENT DOCUMENTS

| | | | | |
|---|---|---|---|---|
| 5,774,357 | A * | 6/1998 | Hoffberg et al. ............. 713/600 |
| 7,010,695 | B1 * | 3/2006 | Mizuguchi ................... 713/185 |
| 7,024,556 | B1 * | 4/2006 | Hadjinikitas et al. ......... 713/168 |
| 7,143,443 | B2 * | 11/2006 | Song et al. ...................... 726/29 |
| 7,185,364 | B2 * | 2/2007 | Knouse et al. .................. 726/8 |
| 7,272,723 | B1 * | 9/2007 | Abbott et al. ................ 713/185 |
| 2002/0035688 | A1 * | 3/2002 | Kutaragi et al. ............. 713/168 |
| 2002/0091946 | A1 * | 7/2002 | Satoh .......................... 713/202 |
| 2002/0104019 | A1 * | 8/2002 | Chatani et al. ............... 713/201 |
| 2003/0065947 | A1 * | 4/2003 | Song et al. .................. 713/201 |
| 2003/0097571 | A1 * | 5/2003 | Hamilton et al. ............ 713/182 |
| 2003/0159031 | A1 * | 8/2003 | Muller et al. ................ 713/155 |
| 2003/0233537 | A1 * | 12/2003 | Wohlgemuth et al. ....... 713/151 |
| 2004/0039930 | A1 * | 2/2004 | Ohmori et al. .............. 713/193 |
| 2005/0066175 | A1 * | 3/2005 | Perlman ...................... 713/176 |
| 2007/0234064 | A1 * | 10/2007 | Nihei ......................... 713/183 |

FOREIGN PATENT DOCUMENTS

| | | |
|---|---|---|
| CN | 1401172 | 5/2003 |
| JP | 03-029461 | 2/1991 |
| JP | 06-233046 | 8/1994 |
| JP | 06-258885 | 9/1994 |
| JP | 10-093948 | 4/1998 |
| JP | 2001-103233 | 4/2001 |
| JP | 2002-292980 | 10/2002 |
| JP | 2003-244449 | 8/2003 |

* cited by examiner

*Primary Examiner*—Kambiz Zand
*Assistant Examiner*—Teshome Hailu
(74) *Attorney, Agent, or Firm*—Edwards Angell Palmer & Dodge LLP; David G. Conlin, Esq.; David A. Tucker, Esq.

(57) ABSTRACT

A request signal requesting a response signal from an ID card is transmitted, and, when a response signal is received, it is compared with the data identifying the manager, which is stored in advance, and a determination is made as to whether or not the data identifying the manager is received. If the data is determined to be received, a timer is set, and, if there is a job being held up, the output processing of the job is executed. When it is determined that a predetermined time has elapsed, outputting is notified to be restricted, thereafter outputting is prohibited.

18 Claims, 17 Drawing Sheets

DATA OUTPUT APPARATUS

CROSS-REFERENCE TO RELATED APPLICATIONS

This non-provisional application claims priority under 35 U.S.C. §119(a) on Patent Application No. 2003-383095 filed in Japan on Nov. 12, 2003, the entire contents of which are hereby incorporated by reference.

BACKGROUND OF THE INVENTION

The present invention relates to a data output apparatus capable of permitting outputting of data when the presence of the apparatus's manager is confirmed.

Image forming apparatuses such as digital multi-function machines that process electronic data of a document while temporarily storing the data in the apparatus have been merchandised. A digital multi-function machine comprises a scanner unit for reading an image of a document and a printer unit for forming an image on paper, and has a plurality of functions such as the copy function, facsimile function, scanner function and print function. To the users, such a digital multi-function machine proposes improving the operation efficiency and the processing ability by positioning it as a data processing device for efficiently processing data inputted from a plurality of interfaces over communication networks. Moreover, the digital multi-function machine incorporates a storage device such as a hard disk so that it can simultaneously receive various data to be processed, and sequentially process a plurality of received processing requests. In the case where the digital multi-function machine has a document filing function, the data stored in the storage device can be read at any time if the user operates an operating unit of the digital multi-function machine, or the user operates an information processing device connected thereto through a communication network, and thus it is possible to perform output processing based on the read data.

Thus, by converting a document into electronic data, it is possible to store the data in the storage device and read and output the data from the storage device when the need arises, and therefore there is an advantage in terms of management. However, the electronic data has problems from the point of view of data protection because it can be easily copied or modified. Further, there is a possibility that the data may leak by erroneous operations performed by the user itself, or illegal operations performed by third parties, and therefore there is a demand for improving security.

In order to solve the problems, apparatuses having the function of restricting users were proposed (see, for example, Japanese Patent Application Laid-Open No. 6-258885 (1994) and 10-93948 (1998)). For example, in a copying machine management apparatus disclosed in Japanese Patent Application Laid-Open No. 6-258885 (1994), the use of the copying function is allowed only when the user is authenticated using a pre-registered secret identification number. On the other hand, in an information reception controller disclosed in Japanese Patent Application Laid-Open No. 10-93948 (1998), receiving of information transmitted from an external device is restricted based on reception restricting information preset for each user.

Further, an image forming apparatus having the function of restricting output was proposed. In this apparatus, when creating a print job in an information processing device connected to the image forming apparatus through a communication network, information about expiration date is given to the print job, and outputting is restricted based on the given information about expiration date when processing the print job in the image forming apparatus (see, for example, Japanese Patent Application Laid-Open No. 2002-292980).

However, although the apparatuses disclosed in Japanese Patent Application Laid-Open No. 6-258885 (1994) and 10-93948 (1998) can permit the preset users to use the copy function or receive information, they do not restrict reading of data stored in the apparatuses, and therefore these apparatuses still have a problem, namely there is a possibility that data may leak.

On the other hand, since the image forming apparatus disclosed in Japanese Patent Application Laid-Open No. 2002-292980 can restrict outputting for a print job for which an expiration date is set, it is possible to effectively prevent leakage of data. However, if the user himself/herself does not know that the apparatus can set the expiration date, or if the user does not set the expiration date to avoid the time-taking work, the ability to protect the data is decreased, and a problem arises, namely security cannot be sufficiently ensured.

BRIEF SUMMARY OF THE INVENTION

The present invention has been made with the aim of solving the above problems, and it is an object of the present invention to provide a data output apparatus capable of surely preventing leakage of data, without decreasing convenience, by a structure in which, when information identifying a specific user is received, measuring time is started, and outputting of data from output means is prohibited when it is determined based on the measured time that a predetermined time has elapsed.

A data output apparatus according to the present invention is a data output apparatus comprising means for receiving data, and output means (first output means) for outputting the received data, and characterized by comprising: storing means (first storing means) for storing information identifying a specific user; means (information receiving means) for receiving information identifying a user; means for determining, based on the information stored in the storing means (first storing means), whether or not the information received by the information receiving means is the information about the specific user; means for starting to measure time when it is determined that the received information is the information about the specific user; means for determining, based on the measured time, whether or not a predetermined time has elapsed; and means for prohibiting the outputting of data from the output means (first output means) when it is determined that the predetermined time has elapsed.

According to the present invention, when the information identifying a specific user is received, measuring the time is started, and when it is determined based on the measured time that a predetermined time has elapsed, outputting of data from the output means (first output means) is prohibited. Therefore, for example, if the presence of the specific user such as the manager of the apparatus is not confirmed, outputting of data to an external device is restricted. Further, even when the presence of the specific user is confirmed, if the predetermined time has elapsed, outputting of data to an external device is restricted.

The data output apparatus according to the present invention is characterized by comprising: means (second storing means) for storing the received data; and means for determining whether or not data to be outputted from the output means (first output means) is stored, when it is determined that the information about the specific user is received, wherein if it is determined that data to be outputted from the first output means is stored, outputting is started.

According to the present invention, if there is stored data when the information about the specific user is received, outputting is started. Therefore, when the information about the specific user is received, outputting of data is automatically started without requiring a special operation, and consequently a decrease in the processing efficiency is prevented.

The data output apparatus according to the present invention is characterized by further comprising: means for encrypting the received data; means (third storing means) for storing the encrypted data; and means for decrypting the encrypted data when outputting the data from the output means (first output means).

According to the present invention, since the data output apparatus comprises means for encrypting the received data and means for decrypting the encrypted data when outputting the data, even when a leakage of data occurs, this data is difficult to read.

The data output apparatus according to the present invention is characterized by comprising: means for generating a decryption key for decrypting the encrypted data; means (fourth storing means) for storing the generated decryption key; means for starting to measure time when the decryption key is stored, or when the information about the specific user is received; means for determining, based on the measured time, whether or not a predetermined time has elapsed; and means for deleting the decryption key when it is determined that the predetermined time has elapsed.

According to the present invention, a decryption key for decrypting the encrypted data is generated and stored, measuring the time is started when the decryption key is generated or when the information about the specific user is received, a determination is made based on the measured time as to whether or not a predetermined time has elapsed, and the decryption key is deleted when it is determined that the predetermined time has elapsed. Therefore, the chance that the third parties may illegally acquire the decryption key is reduced, and it is possible to improve data protection.

The data output apparatus according to the present invention is characterized by comprising: means for transmitting information requesting the decryption key for decrypting the data to an external device; and means for receiving the decryption key transmitted in response to the request, wherein the received decryption key is stored.

According to the present invention, since the data output apparatus comprises means for receiving the decryption key transmitted in response to a request, it is possible to acquire the decryption key when the need arises.

The data output apparatus according to the present invention is characterized by comprising means for determining whether or not encrypted data is present, wherein if there is a stored decryption key when it is determined that encrypted data is present, decryption of the data is started.

According to the present invention, if there is a stored decryption key when it is determined that encrypted data is present, the decryption of the data is started. Therefore, when the decryption key is acquired, the outputting of data is automatically started without requiring a special operation, and consequently a decrease in the processing efficiency can be prevented.

The data output apparatus according to the present invention is characterized by comprising: means for transmitting a transmission request for the information identifying the user to an external device; and means for receiving the information transmitted in response to the transmission request.

According to the present invention, since the data output apparatus comprises means for transmitting a transmission request for the information identifying the user to an external device, and means for receiving the information transmitted in response to the transmission request, it is possible to acquire the information about the user by using various types of communications, regardless of wireless or wire type. Consequently, it is possible to improve convenience and expand the range of applications.

The data output apparatus according to the present invention is characterized in that the output means (first output means) is means for transmitting data to an external device.

According to the present invention, the data output apparatus comprises means for transmitting data to an external device as the output means (first output means). Therefore, the data is transmitted to an external device at the stage the presence of the manager or the decryption key is confirmed.

The data output apparatus according to the present invention is characterized by further comprising means for notifying whether or not the outputting of data by the output means (first output means) is permitted.

According to the present invention, since a notification indicating whether or not outputting of data is permitted is given, the user can know in advance whether or not the use of the apparatus is allowed.

The data output apparatus according to the present invention is characterized by further comprising output means (second output means) for outputting data, which is different from the output means (first output means), wherein the outputting of data from the second output means is permitted regardless of whether or not the information about the specific user is received.

According to the present invention, the data output apparatus separately comprises the output means (second output means) capable of outputting data without depending on whether or not the information about the specific user is received. Therefore, when the manager or the decryption key is not confirmed, it is possible to modify the setting to prohibit reading of data stored in a storage device such as a HDD device, for example, and permit outputting of an image onto paper by print processing, and thus it is possible to improve data protection without decreasing convenience.

According to the present invention, when the information identifying a specific user is received, measuring the time is started, and when it is determined based on the measured time that the predetermined time has elapsed, the outputting of data from the output means is prohibited. Therefore, for example, if the presence of the specific user such as the manager of the apparatus is not confirmed, outputting of data to an external device can be restricted, thereby improving data protection. Further, even when the presence of the specific user is confirmed, if the predetermined time has elapsed, it is possible to restrict the outputting of data to an external device, thereby improving data protection.

According to the present invention, if there is stored data when the information about the specific user is received, outputting is started. Therefore, when the information about the specific user is received, the outputting of data is automatically started without requiring a special operation, and consequently a decrease in the processing efficiency can be prevented.

According to the present invention, the data output apparatus comprises means for encrypting the received data and means for decrypting the encrypted data when outputting the data, and therefore even when a leakage of data occurs, this data is difficult to read.

According to the present invention, a decryption key for decrypting the encrypted data is generated and stored, measuring the time is started when the decryption key is generated or when the information about the specific user is received, a determination is made based on the measured time as to whether or not a predetermined time has elapsed, and the decryption key is deleted when it is determined that the predetermined time has elapsed. Therefore, the chance that the third parties may illegally acquire the decryption key is reduced, and it is possible to improve data protection.

According to the present invention, since the data output apparatus comprises means for receiving the decryption key transmitted in response to a request, it is possible to acquire the decryption key when the need arises.

According to the present invention, if there is a stored decryption key when it is determined that encrypted data is present, the decryption of the data is started. Therefore, when the decryption key is acquired, the outputting of data is automatically started without requiring a special operation, and consequently a decrease in the processing efficiency can be prevented.

According to the present invention, since the data output apparatus comprises means for transmitting a transmission request for the information identifying the user to an external device, and means for receiving the information transmitted in response to the transmission request, it is possible to acquire the information about the user by using various types of communications, regardless of wireless or wire type. Consequently, it is possible to improve convenience and expand the range of applications.

According to the present invention, the data output apparatus comprises means for transmitting data to an external device as the output means. It is therefore possible to transmit the data to an external device at the stage the presence of the manager or the decryption key is confirmed.

According to the present invention, since a notification indicating whether or not outputting of data is permitted is given, it is possible to inform the user in advance of whether or not the use of the apparatus is allowed.

According to the present invention, the data output apparatus separately comprises output means capable of outputting data without depending of whether or not the information about the specific user is received. Therefore, if the manager or the decryption key is not confirmed, it is possible to modify the setting to prohibit reading of data stored in storage device such as a HDD device, for example, and permit outputting of an image onto paper by print processing, and thus it is possible to improve data protection without decreasing convenience.

The above and further objects and features of the invention will more fully be apparent from the following detailed description with accompanying drawings.

DETAILED DESCRIPTION OF THE INVENTION

The following description will specifically explain the present invention, based on the drawings illustrating some embodiments thereof.

Embodiment 1

Figure 1:
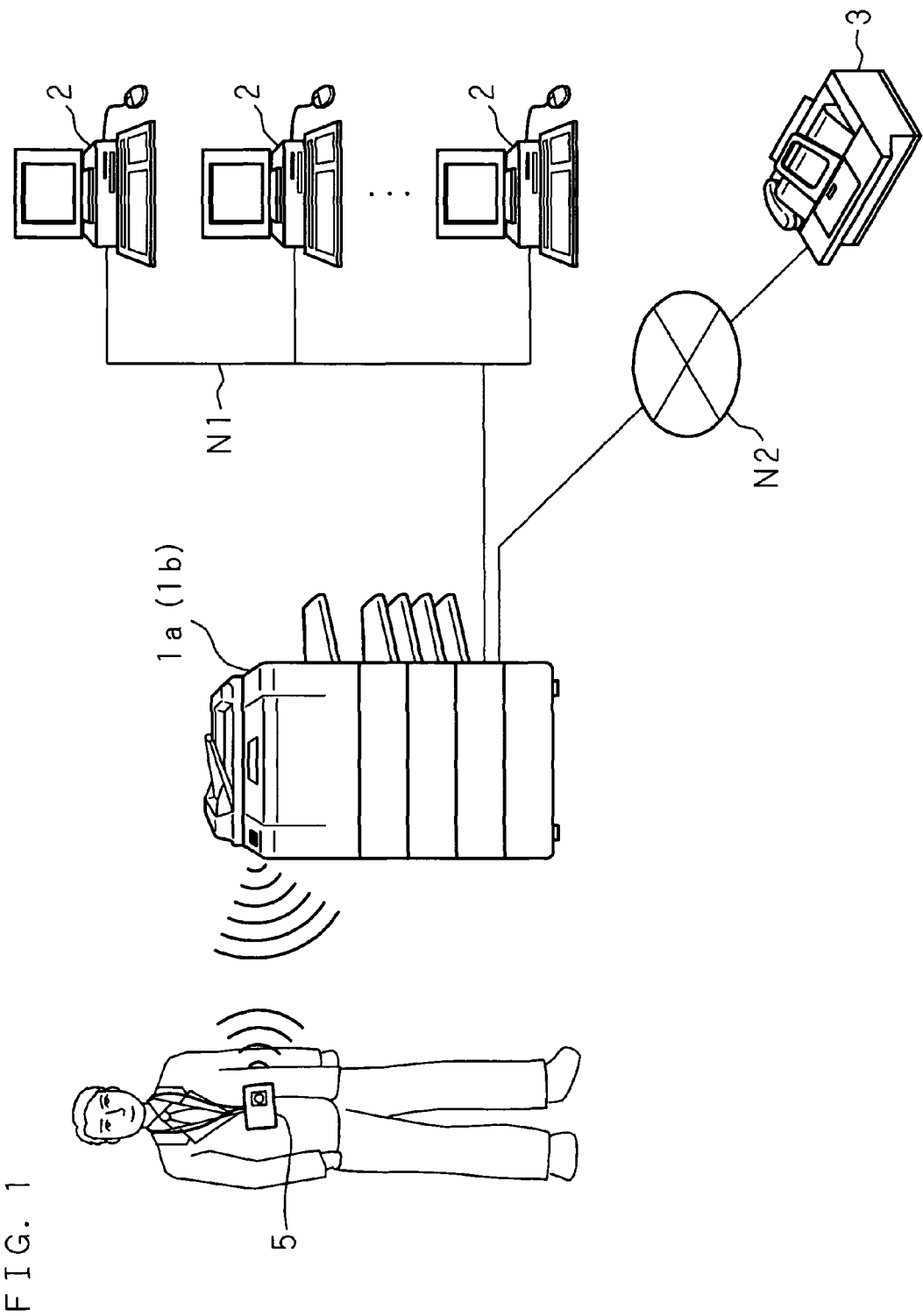
FIG. 1 is a schematic view for explaining the entire structure of an image forming system constituted by a digital multi-function machine according to an embodiment of the present invention.

FIG. 1 is a schematic view for explaining the entire structure of an image forming system constituted by a digital multi-function machine according to Embodiment 1. In FIG. 1, the reference numeral 1a represents a digital multi-function machine having the printer function, copy function, scanner function and facsimile function. Information processing devices 2, such as personal computers and work stations, are connected to the digital multi-function machine 1a through a communication network N1, and an external facsimile machine 3 is connected through a facsimile communication network N2. A driver program (printer driver) for using the digital multi-function machine 1a through the communication network N1 is preinstalled on each information processing device 2, so that the information processing device 2 can execute print processing by creating a print job and transmitting the created print job to the digital multi-function machine 1a by using the printer driver. Moreover, the digital multi-function machine 1a comprises means for encoding and decoding facsimile data which is transmitted through the facsimile communication network N2. The digital multi-function machine 1a transmits the encoded facsimile data to the facsimile machine 3, and executes print processing based on image data obtained by decoding the facsimile data transmitted from the facsimile machine 3 after receiving it.

Further, the digital multi-function machine 1a has a so-called document filing function, and can temporarily store image data, such as image data developed from a received print job, image data obtained by encoding the received facsimile data, and image data obtained from a later-described image reading unit, in non-volatile storing means, and can perform output processing by reading the image data from the storing means when the need arises. In short, the digital multi-function machine 1a according to this embodiment has a plurality of output channels, and the output processing is performed using an output channel for outputting data as an image by printing the data on paper, an output channel for transmitting the data itself to the information processing device 2 through the communication network N1, and an output channel for transmitting the data as facsimile data through the facsimile communication network N2.

In this embodiment, outputting of data from the above-mentioned output channels is restricted based on whether or not a specific user such as the manager of the apparatus (hereinafter simply referred to as the manager) is present. More specifically, the manager is provided with an ID card 5 having the function of transmitting a signal, including data that identifies the user. When the digital multi-function machine 1a confirms the presence of the manager based on the signal transmitted from the ID card 5, it permits output processing from the output channels only for a predetermined period of time, and imposes a restriction that prohibits outputting when the predetermined time has elapsed.

Figure 2:
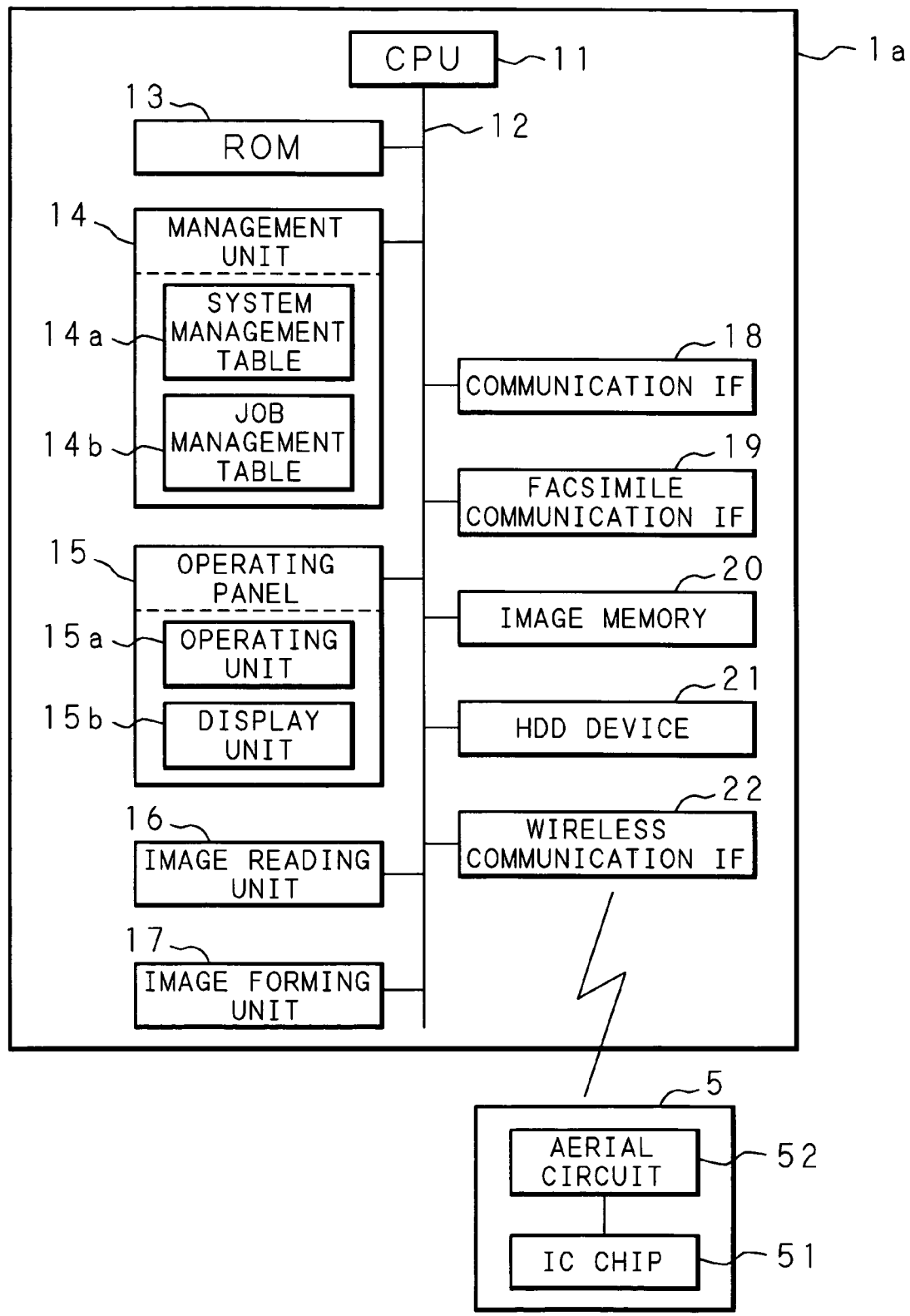
FIG. 2 is a block diagram for explaining the structure of the control system of the digital multi-function machine.

FIG. 2 is a block diagram for explaining the structure of the control system of the digital multi-function machine 1a. The digital multi-function machine 1a comprises a CPU (controller) 11. When the CPU 11 reads and executes a control program pre-stored in a ROM 13, it controls various hardware devices connected thereto through a bus 12, and causes them as a whole to operate as the digital multi-function machine 1a that executes the above-mentioned processing. A management unit 14 is composed of a semiconductor memory, and a part of its storage area is used as a system management table 14a and a job management table 14b. The system management table 14a manages information about the structure of the hardware installed in the digital multi-function machine 1a and information about the operating state (these pieces of information are hereinafter collectively referred to as system composition information). When the power is turned on, the CPU 11 of the digital multi-function machine 1a communicates with the respective hardware devices and obtains the information about the hardware structure, and always monitors the state of the hardware devices being active and updates the contents of the table if there is a change in the operating state. On the other hand, the job management table 14b manages information about received jobs. In other words, when a job such as a print job is received through a later-described communication IF 18, the job management table 14b manages the job name, the name of the device that transmitted the job, the received date, and information about the location where the job is stored in association with each other.

An operating panel 15 is composed of an operating unit 15a for receiving an operating instruction from a user, and a display unit 15b for displaying information to be reported to the user. The operating unit 15a comprises various operating keys for receiving operating instructions from users, and receives instructions from users, including setting values for various functions such as the number of copies to be printed, copy density, and destination of facsimile data; an instruction to switch the respective functions; and an instruction to start outputting. The display unit 15b comprises a liquid crystal display, and displays information such as the operating state of the digital multi-function machine 1a, various setting values inputted through the operating unit 15a, and information to be reported to the user. Moreover, the display unit 15b comprises touch-panel type software keys constructed to receive the above-mentioned setting operations.

An image reading unit 16 comprises a light source for irradiating light on a document to be read, an image sensor such as a CCD (Charge Coupled Device), and an AD converter (not shown). The image reading unit 16 focuses an image of a document set in a predetermined read position onto the image sensor, converts the image into an analog electric signal, and converts the converted analog signal into a digital signal by the AD converter. Then, the image reading unit 16 generates digital image data by correcting the luminous intensity distribution characteristic of the light source when reading the document, the variation in the sensitivity of the image sensor, etc. for the digital signals obtained by AD conversion.

An image forming unit 17 comprises, for example, a charger for charging a photosensitive drum to a predetermined electric potential; a laser write device for generating an electrostatic latent image on the photosensitive drum by emitting laser light according to the image data received from an external device; a developing device for developing an image by supplying toner to the electrostatic latent image formed on the photosensitive drum surface; and a transfer device (not shown) for transferring the toner image formed on the photosensitive drum surface to paper. The image forming unit 17 forms an image desired by the user on paper by using an electrophotographic technique.

In this embodiment, although an image is formed by the electrophotographic technique using the laser write device, it is, of course, possible to form an image by using an ink jet technique, a heat transfer technique, or a sublimation technique.

The communication IF 18 comprises a communication interface according to the communication standards of the communication network N1, receives print jobs from the information processing devices 2 connected to the communication network N1, and transmits information to be reported to the information processing devices 2. In the case where the digital multi-function machine 1a is used as a so-called network scanner, the image data of the document obtained by the image reading unit 16 is transmitted to a desired information processing device 2 through the communication IF 18. The communication IF 18 controls the transmission and reception of such various types of data.

A facsimile communication IF 19 comprises a line termination circuit for connecting the facsimile machine 3 to an external device, and receives facsimile data transmitted through the facsimile communication network N2. The facsimile communication IF 19 comprises a decoding circuit for decoding the received facsimile data, and transfers image data obtained by decoding to an image memory 20. Moreover, the facsimile communication IF 19 comprises an encoding circuit for encoding facsimile data to be transmitted, and transmits the facsimile data encoded by the encoding circuit to a target facsimile machine 3. The facsimile communication IF 19 executes the transmission and reception of facsimile data, and encoding and decoding processing on facsimile data.

The image memory 20 is composed of a semiconductor memory, and temporarily stores image data generated by reading an image on a document by the image reading unit 16, image data developed from a print job received through the communication IF 18, and image data developed from facsimile data received through the facsimile communication IF 19. According to an instruction from the CPU 11, the image data stored temporarily in the image memory 20 is transferred to a transfer location corresponding to the purpose of use. In short, when forming an image on paper, the image data is transferred to the image forming unit 17; when transmitting the image data as scanner data to the information processing device 2, it is transferred to the communication IF 18; when transmitting the image data as facsimile data, it is transferred to the facsimile communication IF 19; and when retaining the image data by using the document filing function, it is transferred to a HDD device 21.

The HDD device 21 is a magnetic recording medium in the shape of a disk, and a part of its storage area is used as a data storage area for storing an inputted job and image data generated therein. When a request is received through the operating panel 15, or when a request transmitted from an information processing device 2 is received through the communication IF 18, the HDD device 21 reads the job or image data stored in the data storage area. Thus, if there is a need to execute the print processing again due to failure of printing or a shortage of the number of copies outputted, it is possible to execute the print processing by arbitrarily reading the job or image data stored in the data storage area. Note that the data storage area is divided into a first data storage area and a second data storage area, and the capacity of the first data storage area is set smaller compared to that of the second data storage area. Accordingly, when the available space of the first data storage area becomes smaller, data which has exceeded a predetermined time since it was stored in the first data storage area is automatically stored in the second data storage area. The second data storage area is an area for storing data, according to each file format, each processing mode such as the printer function, scanner function, copy function, and facsimile function, or each folder created by the user, and retains the data unless an operating instruction such as a deleting instruction is given. When the second data storage area has no available space, this fact is displayed on the display unit 15b of the operating panel 15 so as to inform the user of the fact and cause the user to prepare a new available space by deleting data which seems to be unnecessary, adding a HDD device, or other method.

A wireless communication IF 22 is an interface for performing wireless communication with the ID card 5 of the manager, and comprises a signal generating circuit for generating a predetermined request signal requesting the ID card 5 to transmit a response signal; an aerial circuit for transmitting the request signal to an external device and receiving the response signal from the ID card 5; and a receiving circuit for obtaining data identifying the user (manager) from the response signal received by the aerial circuit. On the other hand, the ID card 5 comprises an aerial circuit 52 produced by printing a conductor pattern on an insulating substrate (not shown); and an IC chip 51 connected to the aerial circuit 52. According to the request signal transmitted from the wireless communication IF 22 of the digital multi-function machine 1a, electric power is supplied to the aerial circuit 52 of the ID card 5. The IC chip 51 that received electric power through the aerial circuit 52 generates a response signal based on the data identifying the user (manager), which is pre-stored in the non-volatile memory installed therein, and then the aerial circuit 52 transmits the response signal. The data identifying the manager is pre-stored in the ROM 13 of the digital multi-function machine 1a, and whether or not the manager having the ID card 5 is present is confirmed by comparing the data with the data obtained based on the response signal received by the wireless communication IF 22.

Figure 3:
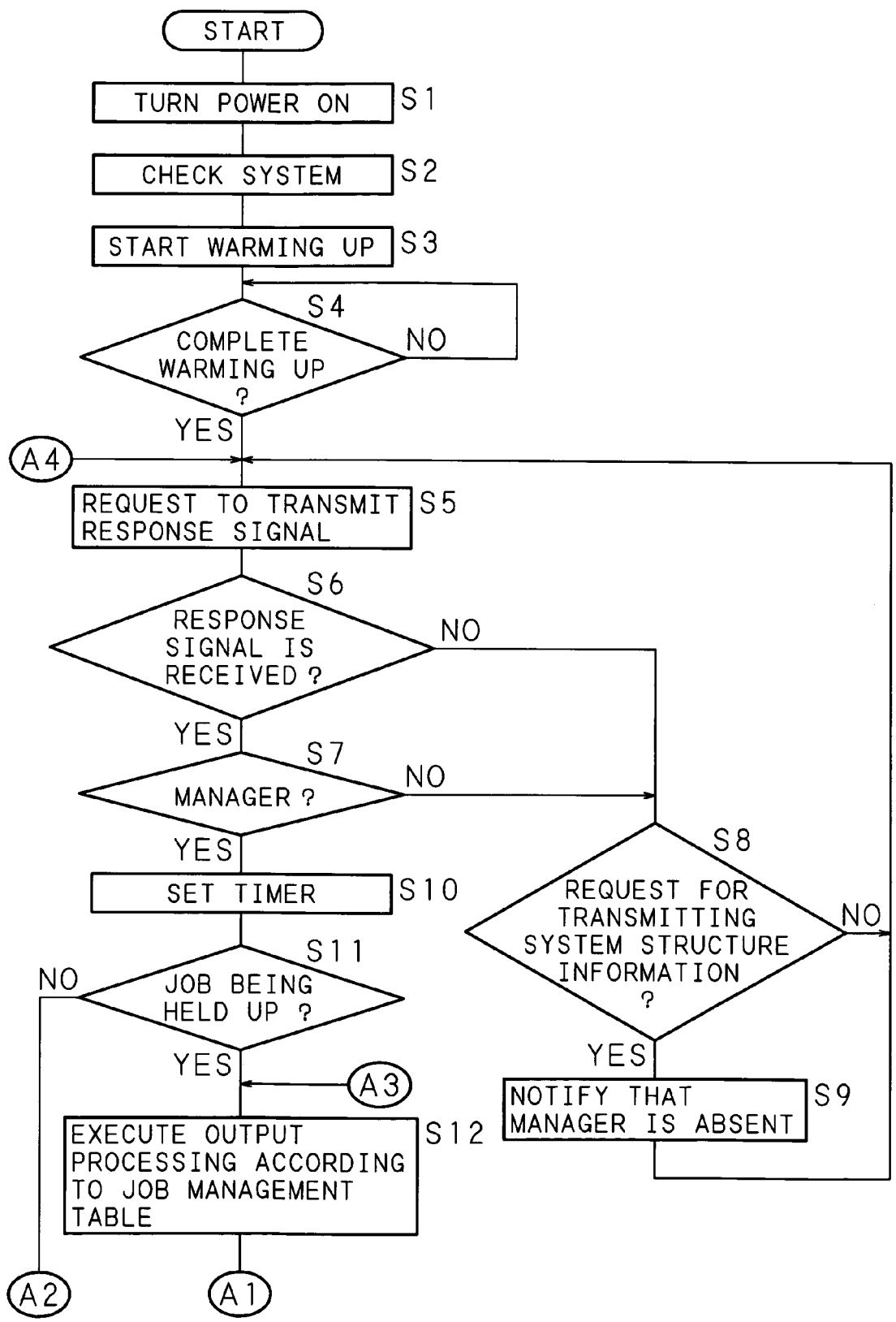
FIG. 3 is a flowchart for explaining the processing steps performed by the digital multi-function machine.
Figure 4:
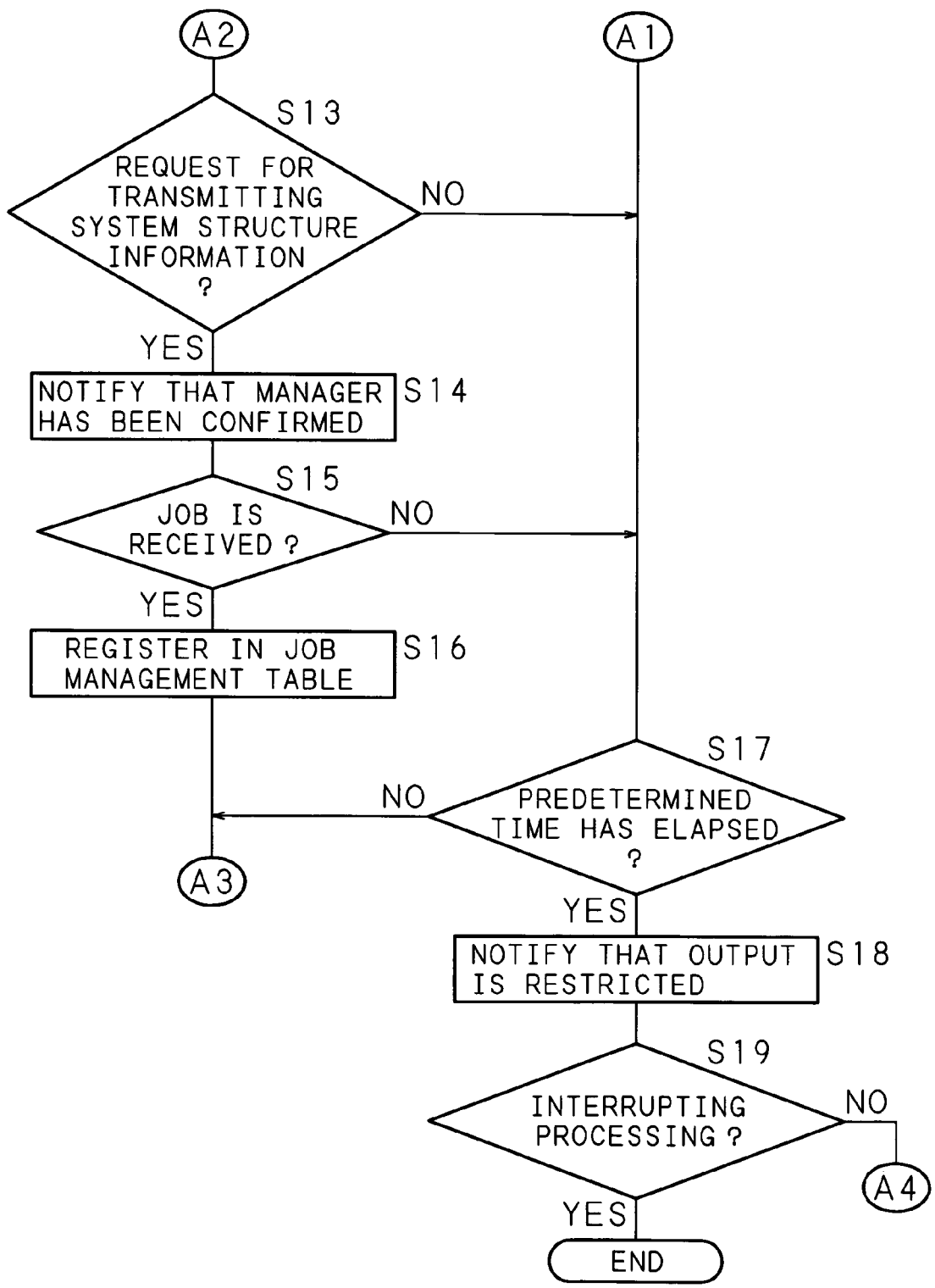
FIG. 4 is a flowchart for explaining the processing steps performed by the digital multi-function machine.

FIG. 3 and FIG. 4 are flowcharts showing the processing steps performed by the digital multi-function machine 1a. When the power of the digital multi-function machine 1a is turned on (step S1), the CPU 11 checks the system, based on the information stored in the system management table 14a in the management unit 14 (step S2). More specifically, the CPU 11 communicates with the respective hardware devices connected thereto through the bus 12 so as to obtain information about the operating state of the respective devices, and performs the process of registering the obtained information on the system management table 14a. Note that the operating state of the respective hardware devices is always monitored by the CPU 11 as described above, and the contents of the system management table 14a are updated whenever a change is made. Next, the CPU 11 starts warming up the image forming unit 17, etc. (step S3), refers to the contents of the system management table 14a and determines whether or not a warm-up is performed completely (step S4). When it is determined that the warm-up has not been performed completely (S4: NO), the CPU 11 waits until the warm-up is performed completely.

When it is determined that the warm-up has been performed completely (S4: YES), the CPU 11 transmits the above-mentioned request signal through the wireless communication IF 22 so as to request the ID card to transmit the response signal (step S5). Next, the CPU 11 monitors the wireless communication IF 22 so as to determine whether or not the response signal transmitted from the ID card in response to the transmission request is received (step S6). When it is determined that the response signal is received (S6: YES), the CPU 11 obtains the data contained in the received response signal and compares the obtained data with the data identifying the manager, which is stored in a predetermined storage area of the ROM 13, so as to determine whether or not data identifying the manager is received (step S7).

When it is determined at step S6 that the response signal is not received by the wireless communication IF 22 (S6: NO), or when it is determined at step S7 that the data identifying the manager is not contained in the response signal (S7: NO), the CPU 11 determines whether or not a request for transmitting the system structure information is received from the information processing device 2 through the communication network N1 (step S8). In other words, the printer driver pre-installed in the information processing device 2 is activated, and a determination is made as to whether or not transmission of the system structure information is required by an access request made through the printer driver. When it is determined that there is no request for transmitting the system structure information (S8: NO), processing is returned to step S5, or when it is determined that there is a request for transmitting the system structure information (S8: YES), the CPU 11 transmits the system structure information to the information processing device 2 requesting the information, and notifies the information processing device 2 that the manager is absent (step S9). Then, processing is returned to step S5.

Figure 5A:
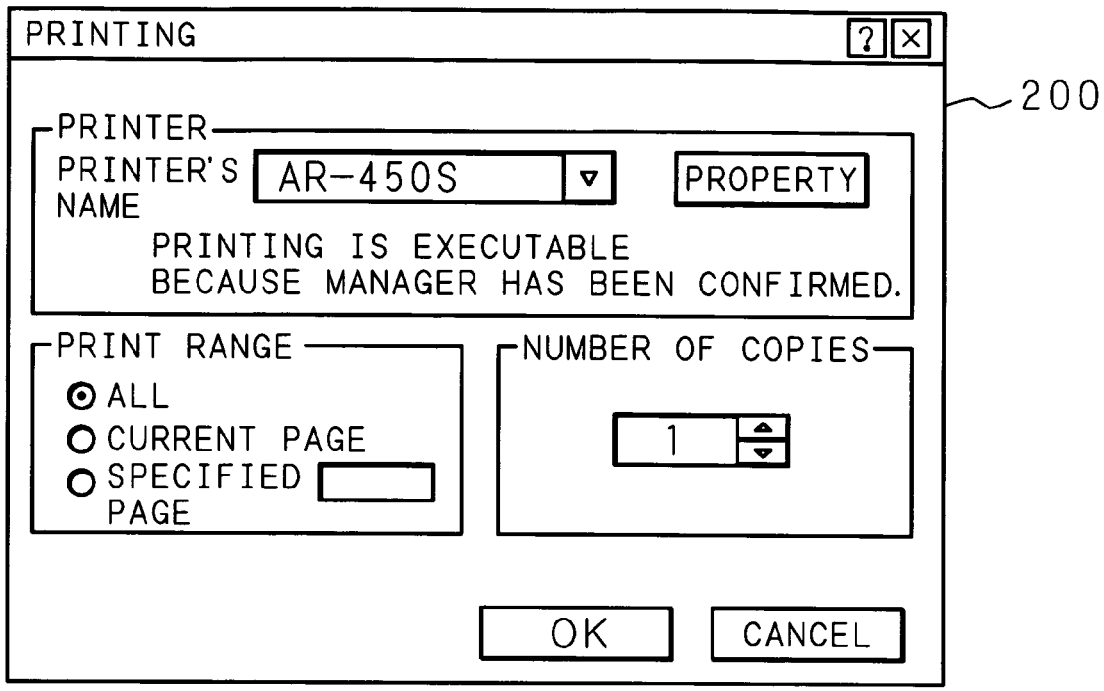
FIG. 5A and FIG. 5B are schematic views showing the content of notification displayed by an information processing device.

When it is determined at step S7 that the data identifying the manager is received (S7: YES), the CPU 11 sets a timer (not shown) (step S10), and refers to the job management table 14b in the management unit 14 and determines whether or not there is a job being held up (step S11). When it is determined that there is no job being held up (S11: NO), the CPU 11 determines whether or not a request for transmitting the system structure information is received from any information processing device 2 connected through the communication network N1 (step S13). When it is determined that a request for transmitting the system structure information is received (S13: YES), the CPU 11 gives the information processing device 2 that made the request a notification indicating that the manager has been confirmed (step S14). On the display unit (not shown) of the information processing device 2 that received this notification, the content of the notification is displayed on a print setting screen 200 outputted by the printer driver as shown in the schematic view of FIG. 5A. In short, the notification indicating that the manager has been confirmed and therefore print processing is executable by the digital multi-function machine 1a is displayed.

Next, the CPU 11 monitors the communication IF 18 and determines whether or not a job is received (step S15). When it is determined that a job is received (S15: YES), the CPU 11 registers the received job in the job management table 14*b* (step S16) and moves to step S12.

On the other hand, when it is determined at step S11 that there is a job being held up (S11: YES), the CPU 11 executes the output processing according to the job management table 14*b* (step S12). In other words, if the job registered in the job management table 14*b* specifies the print processing, then the CPU 11 transfers the image data for printing, which is obtained by developing the job, to the image forming unit 17 and executes the print processing as the output processing. If the job registered in the job management table 14*b* specifies reading of data using the document filing function, the CPU 11 executes the output processing by transmitting the specified data to the information processing device 2 that made the request.

Figure 5B:
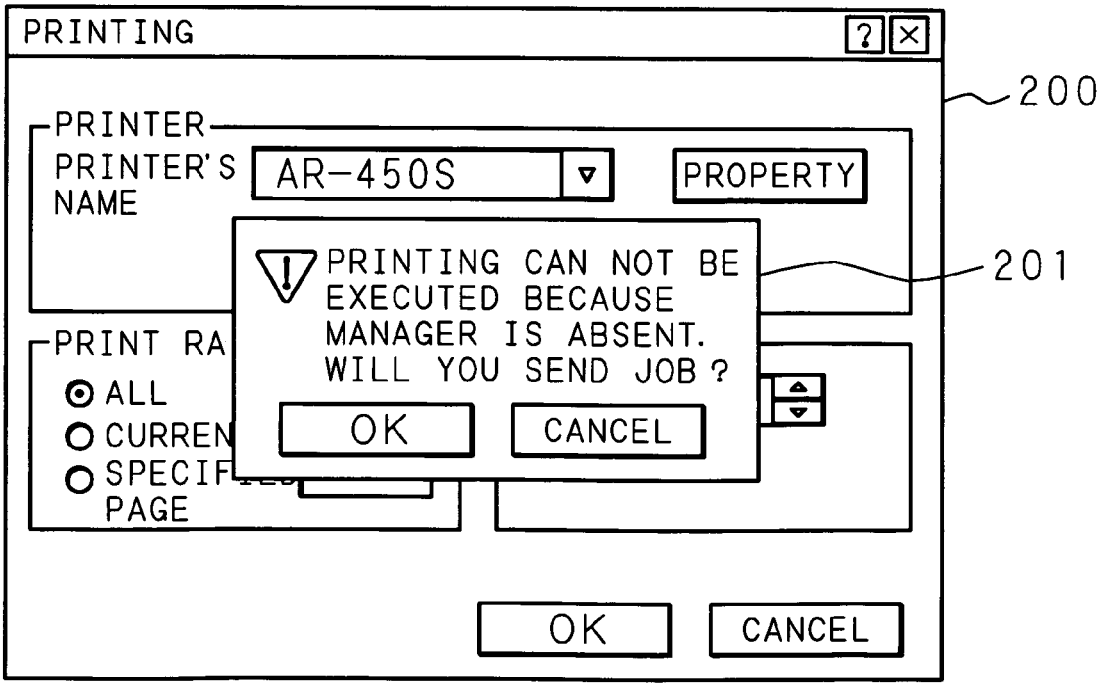

When the output processing is executed according to the job management table 14*b* (S12), when it is determined at step S13 that a request for transmitting the system structure information is not received (S13: NO), or when it is determined at step S15 that a job is not received (S15: NO), the CPU 11 determines, based on the time outputted by the timer, whether or not a predetermined time has elapsed since the timer was set (step S17). When it is determined that the predetermined time has not elapsed (S17: NO), processing is returned to step S12 to continue the output processing for the job being held up. On the other hand, when it is determined that the predetermined time has elapsed (S17: YES), the CPU 11 gives a notification indicating that the output processing is restricted (step S18). The notification indicating that outputting is restricted is given by displaying the notification on the display unit 15*b* of the operating panel 15 of the digital multi-function machine 1*a* and transmitting the data to all information processing devices 2 connected through the communication network N1. Moreover, even when it is determined that access is made through the printer driver pre-installed in the information processing device 2 in the same manner as above, the digital multi-function machine 1*a* gives a notification indicating that the output processing can not be executed because the manager is absent. When the information processing device 2 receives this notification, the print setting screen 200 outputted by the printer driver is overwritten with a guide screen 201 including the content of the notification, and the guide screen 201 is displayed on the display unit of the information processing device 2 as shown in FIG. 5B. After giving the notification indicating that outputting is restricted, the CPU 11 of the digital multi-function machine 1*a* actually restricts (prohibits) the output processing by stopping the print processing performed by the image forming unit 17, the transmission of data from the communication IF 18, and the transmission of facsimile data from the facsimile communication IF 19.

Next, the CPU 11 determines whether or not there is interrupting processing due to resetting of the entire system of the digital multi-function machine 1*a* (step S19), and, when it is determined that there is no interruption (S19: NO), processing is returned to step S5, or, when it is determined that there is interrupting processing (S19: YES), the CPU 11 finishes the processing of this routine.

Embodiment 2

In Embodiment 1, when restricting the outputting of data, the outputting of data from all output channels is restricted, but it may also be possible to restrict the outputting of data only from a predetermined output channel and arbitrarily allow the outputting of data from other output channel. Embodiment 2 illustrates an embodiment in which, when a predetermined time has elapsed since the presence of the manager was confirmed, reading of data stored in the data storage area of the HDD device 21 is restricted by the document filing function, but no restriction is imposed for other output channel, namely an output channel for forming an image on paper by transferring the image data to the image forming unit 17. Note that the structure of the digital multi-function machine 1*a* is exactly the same as in Embodiment 1, and the explanation thereof is omitted.

Figure 6:
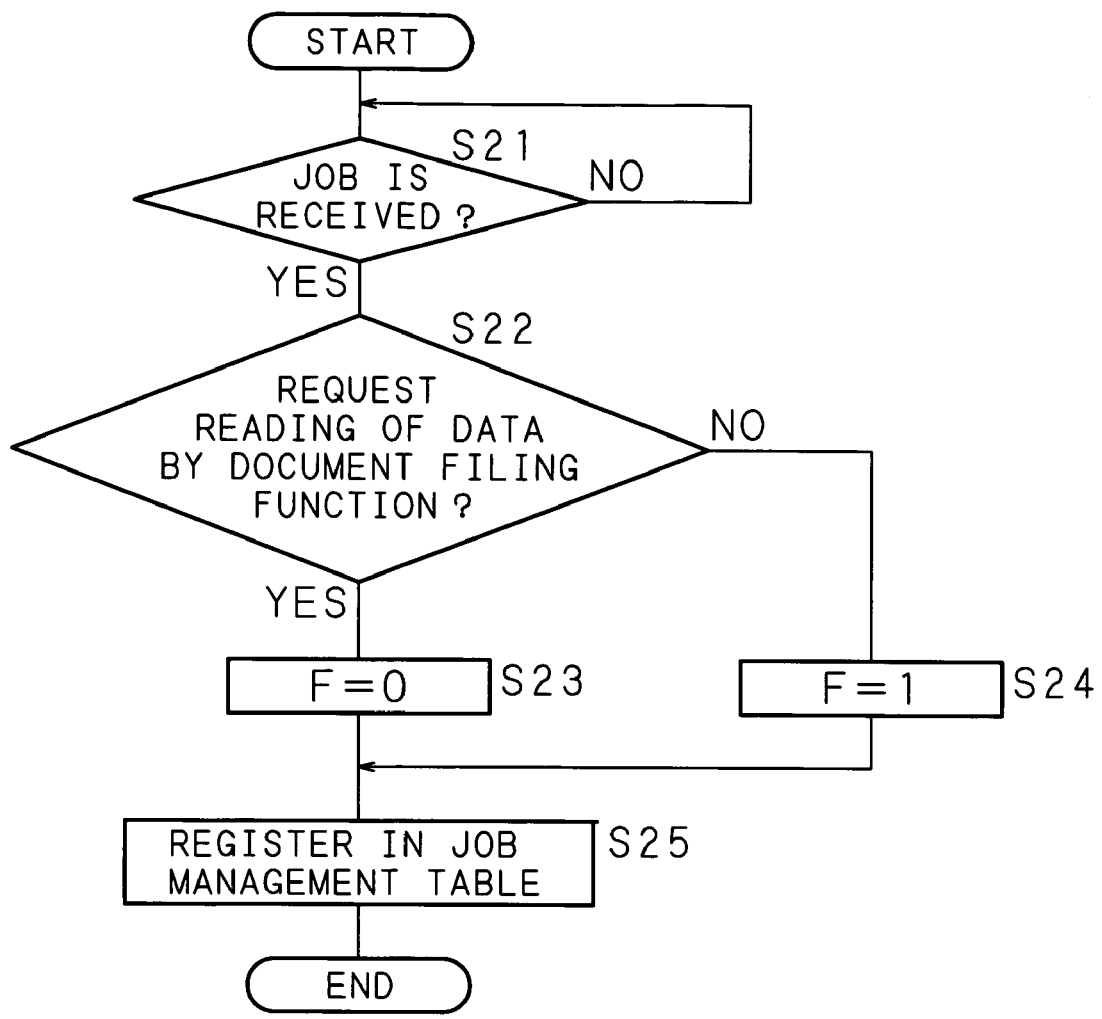
FIG. 6 is a flowchart for explaining the process of storing a received job in a job management table.

FIG. 6 is a flowchart for explaining the process of storing a received job in the job management table. First, the CPU 11 of the digital multi-function machine 1*a* determines whether or not a job is received through the operating panel 15, communication IF 18, or facsimile communication IF 19 (step S21). When it is determined that a job is not received (S21: NO), the CPU 11 waits until a job is received. Then, when it is determined that a job is received (S21: YES), the CPU 11 determines whether or not the received job requests the reading of data by using the document filing function (step S22).

When it is determined that the received job requests the reading of data by using the document filing function (S22: YES), the CPU 11 sets a flag F to 0 (step S23). On the other hand, when it is determined that the received job does not request the reading of data (S22: NO), the CPU 11 sets the flag F to 1 (step S24). Then, the CPU 11 registers the received job and the set flag F in the job management table 14*b* (step S25).

Figure 7:
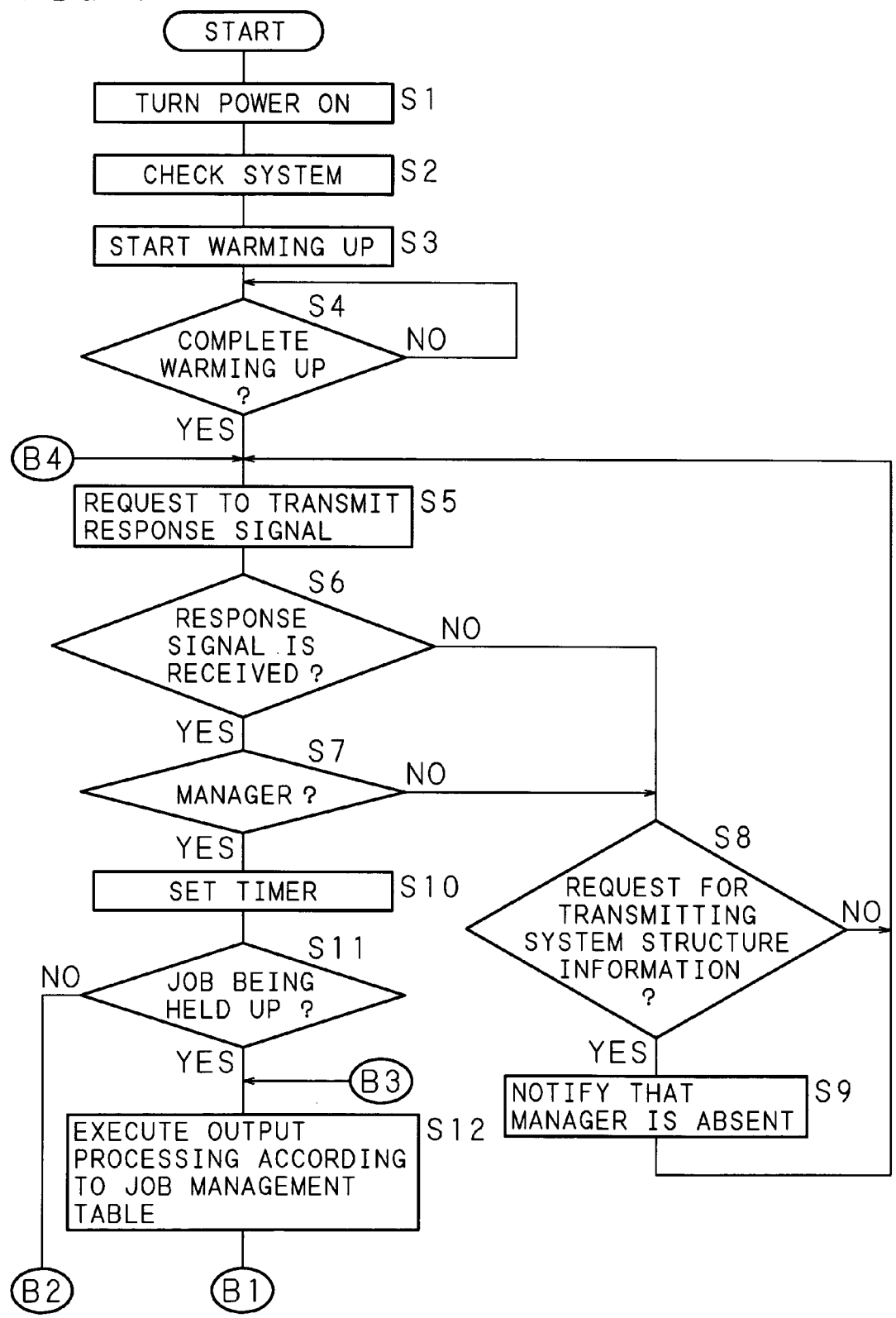
FIG. 7 is a flowchart for explaining the processing steps performed by the digital multi-function machine.
Figure 8:
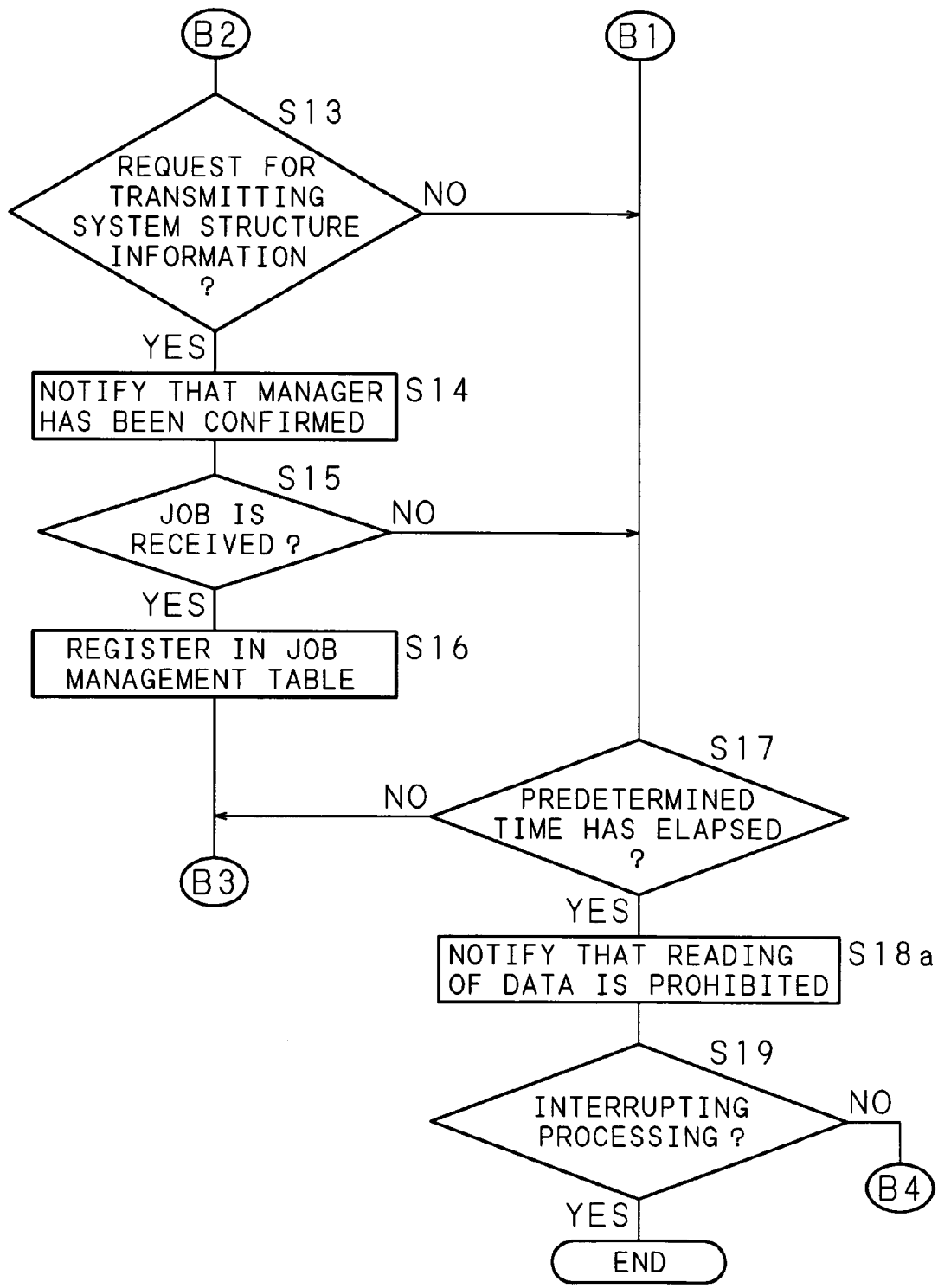
FIG. 8 is a flowchart for explaining the processing steps performed by the digital multi-function machine.

FIG. 7 and FIG. 8 are flowcharts showing the processing steps performed by the digital multi-function machine 1*a*. Note that the same processing as in Embodiment 1 is designated with the same step number, and the explanation thereof is omitted. In Embodiment 2, the processing from step S1 through step S17 is the same as in Embodiment 1, but if the predetermined time has elapsed since the timer was set (S17: YES) after confirming the presence of the manager at step S7 (S7: YES), a notification indicating that reading of data by the document filing function is prohibited is given by displaying the notification on the display unit 15*b* and transmitting data including the content of the notification to the information processing devices 2 (step S18*a*). Further, even when a job with the flag F set to 0, that is, a request to read the data using the document filing function, is received, the CPU 11 of the digital multi-function machine 1*a* restricts (prohibits) outputting by stopping the reading from the second data storage area of the HDD device 21.

Embodiment 3

In Embodiments 1 and 2, a determination as to whether or not the manager is present is made based on whether or not the digital multi-function machine 1*a* has received a signal transmitted from the ID card 5 of the manager, but it may also be possible to determine whether or not the manager is present by determining whether or not a predetermined code (the manager's code) is inputted through the operating panel 15. In Embodiment 3, the structure of the digital multi-function machine 1*a* is the same as in Embodiment 1, but, since the presence of the manager is directly confirmed through the operating panel 15, the digital multi-function machine 1*a*, of course, does not necessarily comprise the wireless communication IF 22.

Figure 9:
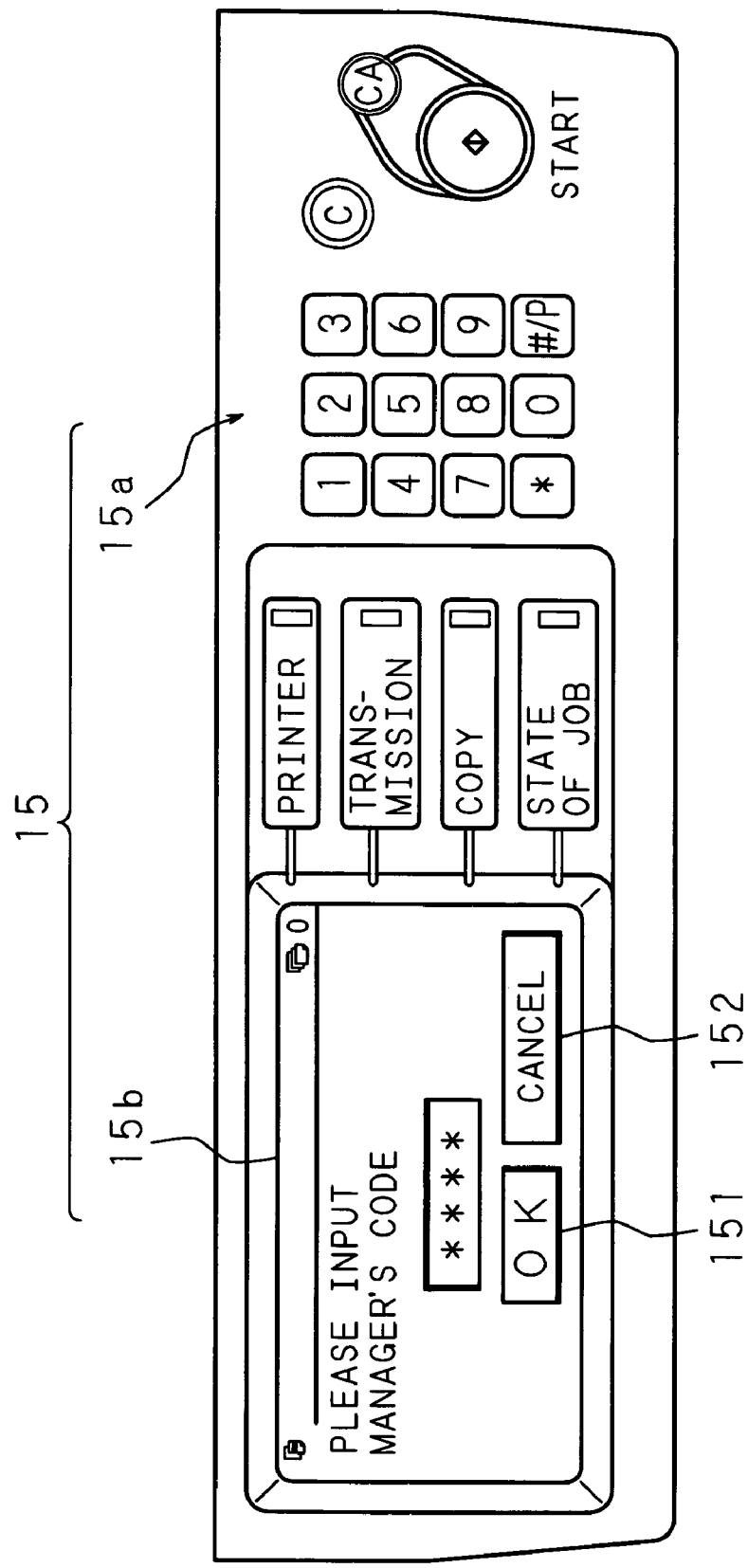
FIG. 9 is a schematic view showing one example of an operating panel of the digital multi-function machine.

FIG. 9 is a schematic view showing one example of the operating panel 15 of the digital multi-function machine 1*a*. The operating panel 15 is composed of the operating unit 15*a* having various hardware keys for receiving instructions from users including the manager, and the display unit 15*b* for displaying information inputted by the operating unit 15*a* and information to be reported to the users. The operating unit 15*a* has the ten-key for inputting numerical values, the start key for starting to read a document, etc., and the clear key for deleting the inputted information as the hardware keys. The display unit 15b is composed of a liquid crystal display device comprising a touch-panel type software keys, and displays various information and receives the operations of the users.

By selecting a predetermined operation through the operating panel 15, the manager can display an input screen for inputting the manager's code on the display unit 15b (see FIG. 9), and can input the preset manager's code (for example, a four-digit numerical value) by using the ten-key of the operating unit 15a. When a determination button 151 illustrated in the lower part of the screen shown in FIG. 9 is depressed/operated, the inputted code is transferred to the CPU 11 of the digital multi-function machine 1a, and then the CPU 11 determines whether the user is the manager or not by comparing the inputted code with the manager's code stored in advance in the ROM 13. On the other hand, when a cancel button 152 is depressed, the inputted code is not transferred, and the process of returning to the screen that called the input screen is performed.

Figure 10:
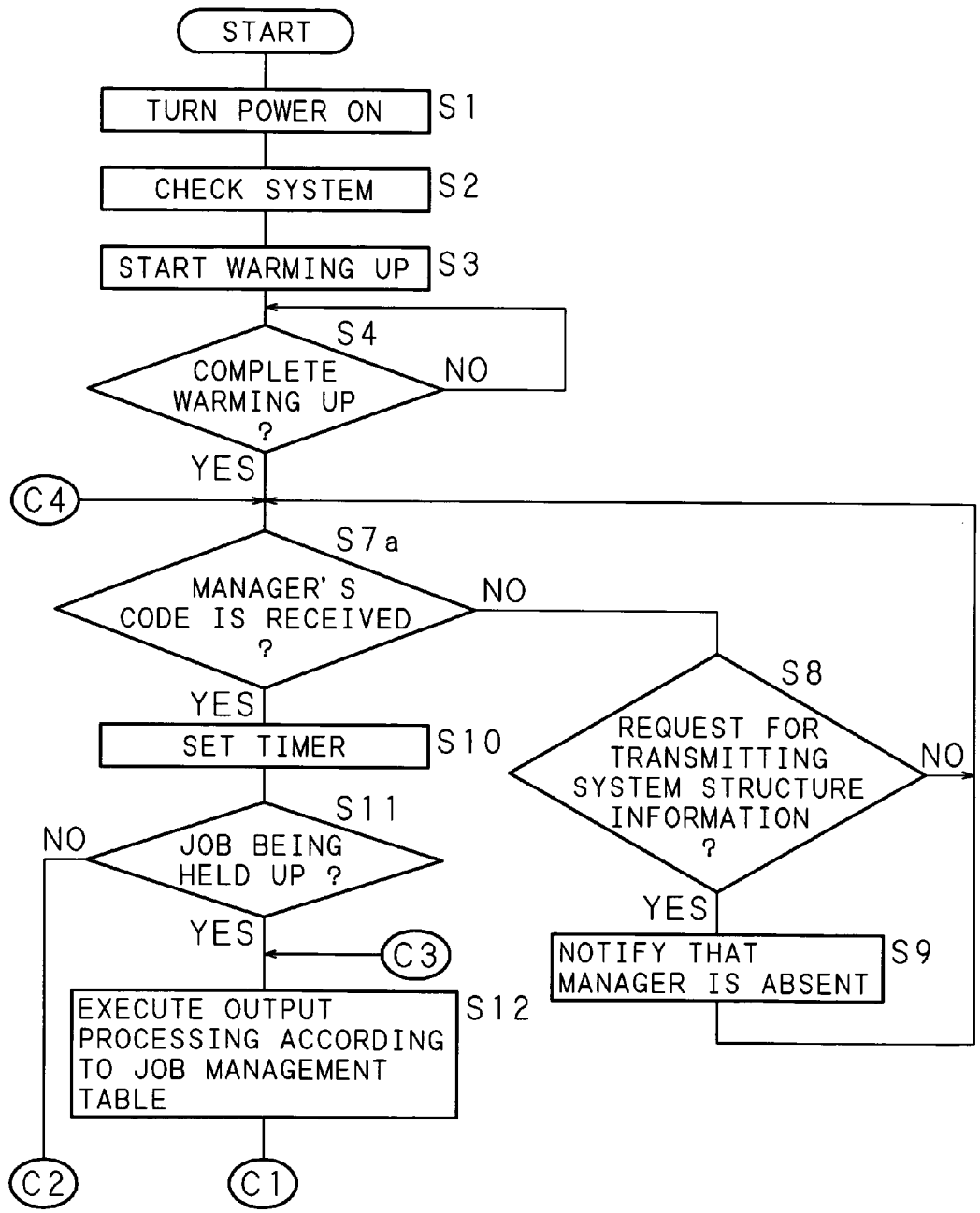
FIG. 10 is a flowchart for explaining the processing steps performed by the digital multi-function machine.
Figure 11:
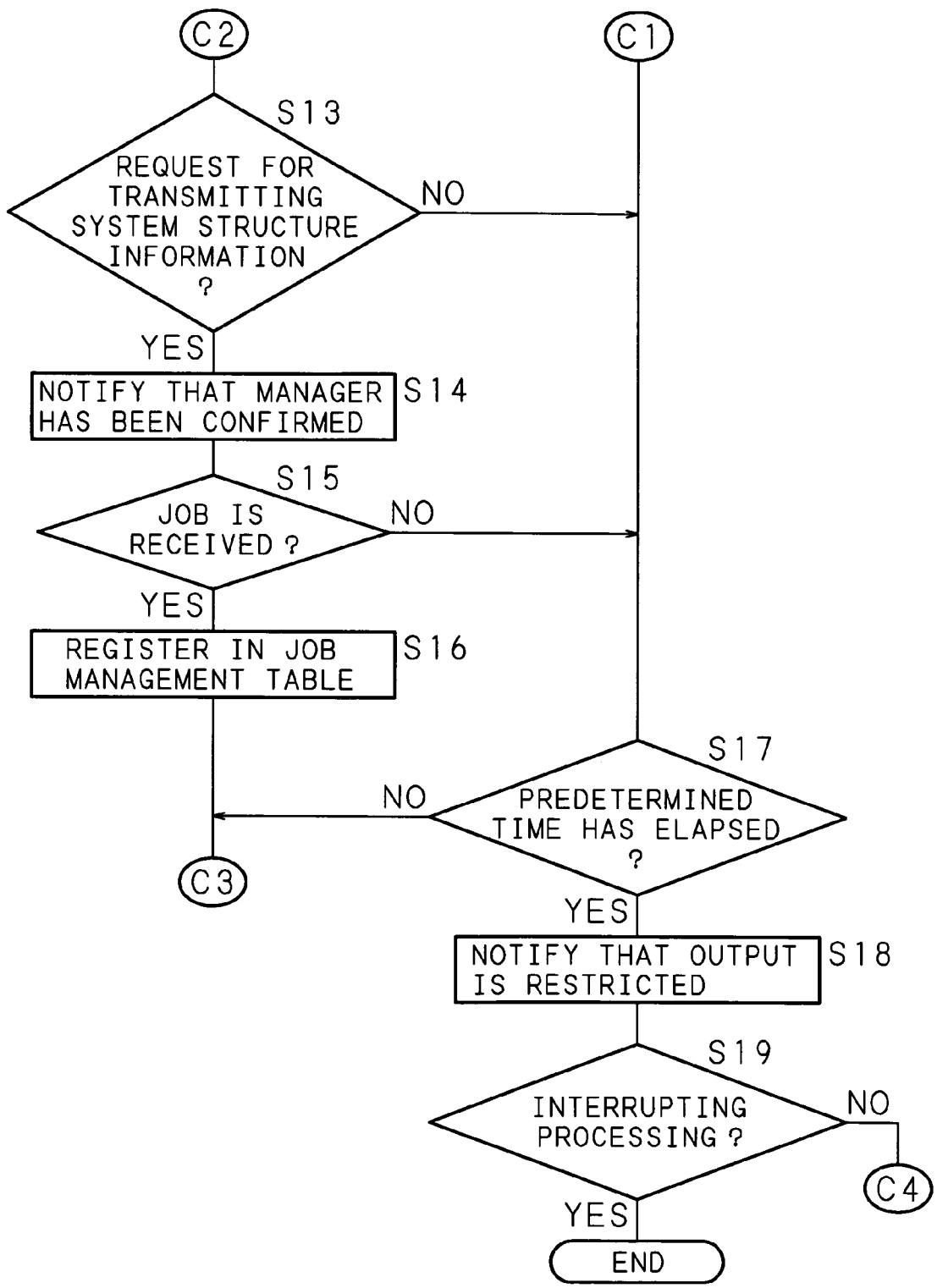
FIG. 11 is a flowchart for explaining the processing steps performed by the digital multi-function machine.

FIG. 10 and FIG. 11 are flowcharts showing the processing steps performed by the digital multi-function machine 1a. Note that the same processing as in Embodiment 1 is designated with the same step number, and the explanation thereof is omitted. In Embodiment 3, only the process of confirming the presence or absence of the manager differs from Embodiment 1. In other words, when it is determined at step S4 that the digital multi-function machine 1a has warmed up completely (S4: YES), the CPU 11 determines whether or not the manager's code is received through the operating panel 15 (step S7a). Then, when it is determined that the manager's code is not received (S7a: NO), that is, when the code is not inputted through the input screen shown in FIG. 9, or when it is determined that inputted code is different from the manager's code stored in advance in the ROM 13, the CPU 11 gives a notification indicating that the manager is absent to the information processing device 2 that made an access request by making a request for transmitting the system structure information (S9).

On the other hand, when it is determined that the manager's code is received (S7a: YES), that is, when it is determined that the code inputted through the input screen shown in FIG. 9 matches the manger's code stored in advance in the ROM 13, the CPU 11 performs the output processing for the job registered in the job management table 14b and newly received job until a predetermined time elapses (S12). Then, when it is determined that the predetermined time has elapsed (S17: YES), the CPU 11 gives a notification indicating that output processing is restricted (prohibited) by displaying the notification on the display unit 15b and transmitting data including the content of the notification to the information processing devices 2 (S18). Further, even when a request from an external device is received, the CPU 11 of the digital multi-function machine 1a stops the output processing from the respective output channels.

Embodiment 4

In Embodiments 1 and 2, a determination as to whether the manager is present or absent is made based on whether or not the digital multi-function machine 1a receives a signal transmitted from the ID card 5 of the manager, but it may also be possible to confirm the presence or absence of the manager indirectly by confirming via the communication network N1 whether or not the information processing device 2 used by the manager is activated. In Embodiment 4, the structure of the digital multi-function machine 1a is also the same as that in Embodiment 1, but, since Embodiment 4 is designed to confirm whether or not the information processing device 2 of the manager is activated via the communication IF 18, the digital multi-function machine 1a, of course, does not necessarily comprise the wireless communication IF 22.

Figure 12:
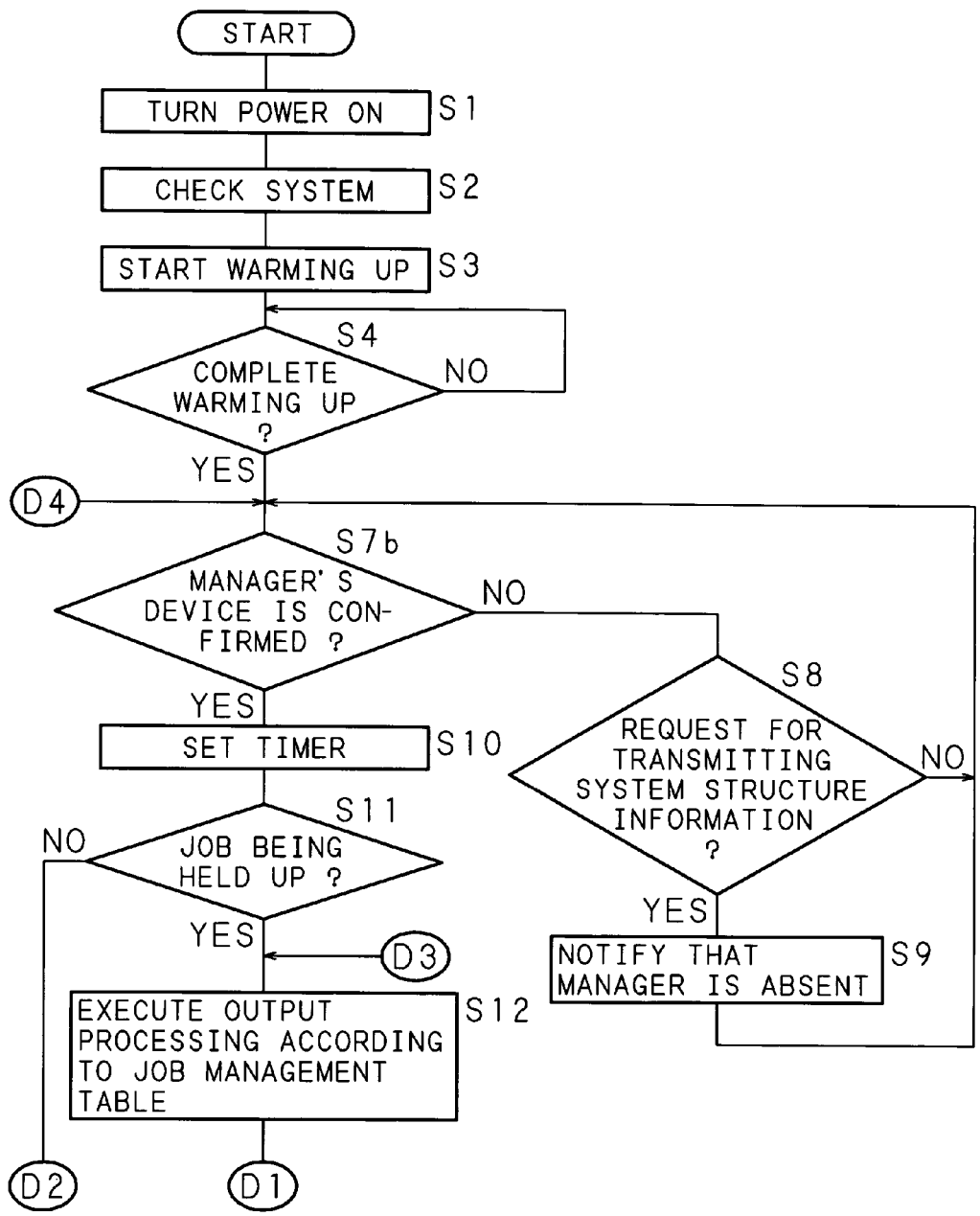
FIG. 12 is a flowchart for explaining the processing steps performed by the digital multi-function machine.
Figure 13:
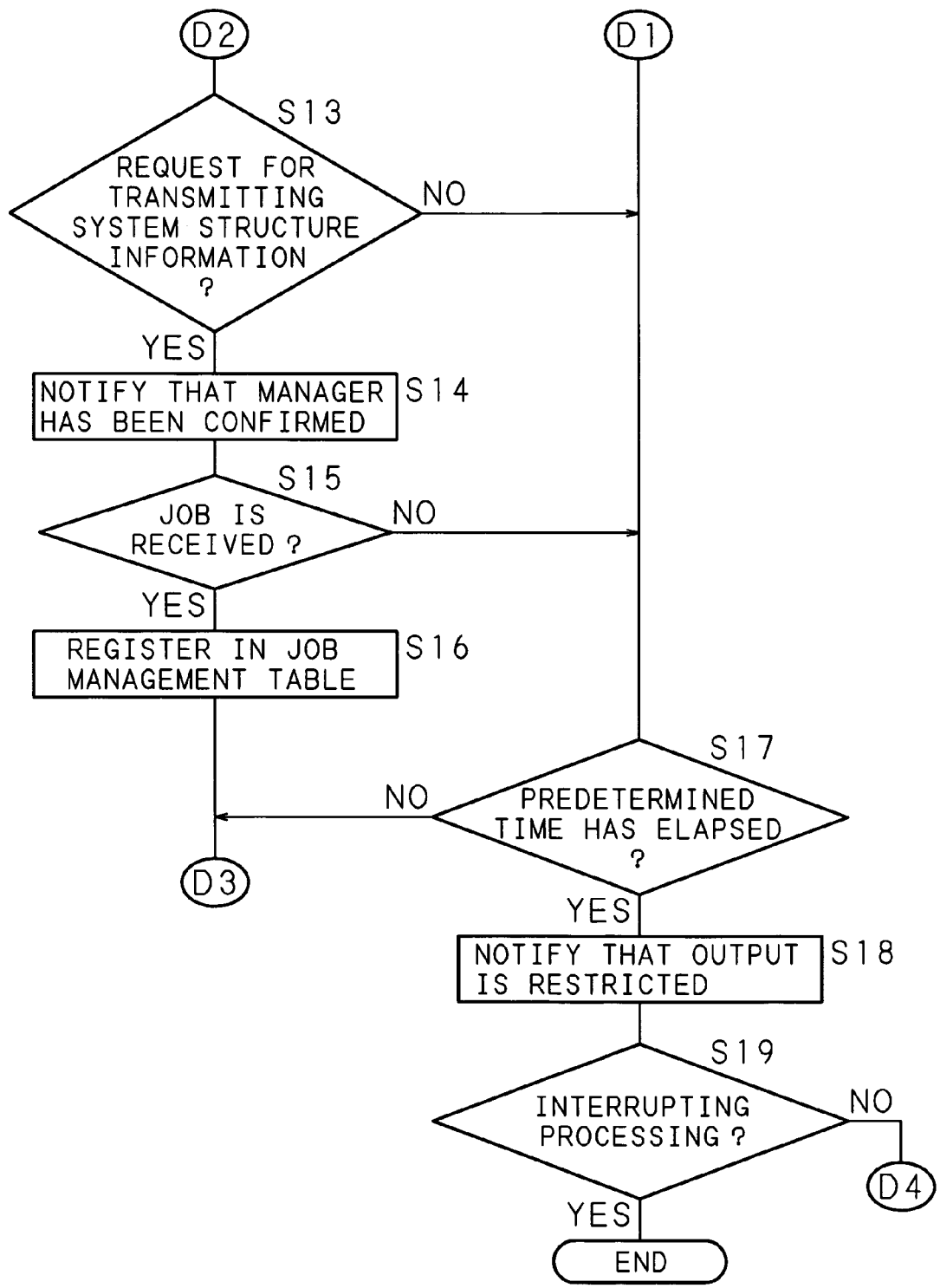
FIG. 13 is a flowchart for explaining the processing steps performed by the digital multi-function machine.

FIG. 12 and FIG. 13 are flowcharts showing the processing steps performed by the digital multi-function machine 1a. Note that the same processing as in Embodiment 1 is designated with the same step number, and the explanation thereof is omitted. In Embodiment 4, only the process of confirming the presence or absence of the manager differs from Embodiment 1. In other words, when it is determined at step S4 that the digital multi-function machine 1a has warmed up completely (S4: YES), the CPU 11 determines whether or not the information processing device 2 used by the manager is confirmed via the communication network N1 (step S7b). In order to confirm the information processing device 2 used by the manager, for example, a command such as a ping command may be transmitted to a device having a predetermined network address. Then, the CPU 11 monitors the communication IF 18 and determines whether or not a response to the command is detected. If the response is detected, the CPU 11 confirms that the device having the above-mentioned address is active.

If the information processing device 2 used by the manager is not confirmed (S7b: NO), that is, even when the above-mentioned command was transmitted, if there is no response from the information processing device 2, it is presumed that the manager is absent, and the CPU 11 gives a notification indicating that the manager is absent to the information processing device 2 that made the access request by making the request for transmitting the system structure information (S9).

On the other hand, if the information processing device 2 used by the manager is confirmed (S7b: YES), that is, if a response to the command is received via the communication network N1, it is presumed that the manager is present, and therefore the CPU 11 performs the output processing for the job registered in the job management table 14b and newly received job until a predetermined time elapses (S12). Then, when it is determined that the predetermined time has elapsed (S17: YES), the CPU 11 gives a notification indicating that the output processing is restricted (prohibited) by displaying the notification on the display unit 15b and transmitting data including the content of the notification to the information processing devices 2 (S18). Moreover, even when the CPU 11 of the digital multi-function machine 1a receives a request from an external device, it stops the output processing from the respective output channels.

Embodiment 5

In order to further improve the function of protecting data by the digital multi-function machine 1a described in Embodiment 1, Embodiment 5 illustrates an embodiment in which data to be stored in the data storage area of the HDD device 21 is encrypted. For example, it is possible to improve the function of protecting data by generating a decryption key when a system check which is performed after turning on the power has been completed; decrypting the data with the decryption key if the presence of the manager is confirmed; and deleting the decryption key when a predetermined time has elapsed since the confirmation of the presence of the manager.

Figure 14:
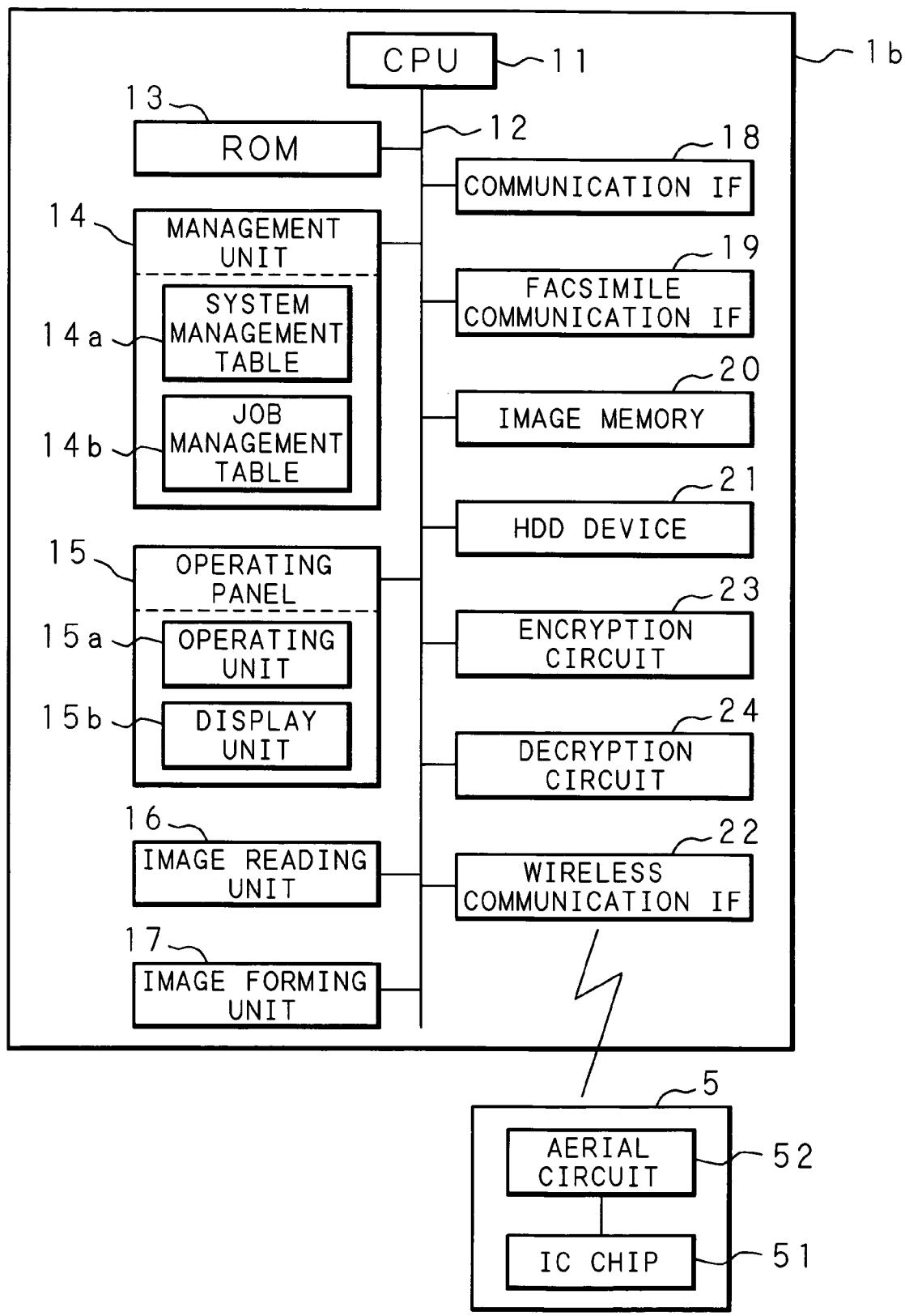
FIG. 14 is a block diagram showing the structure of the control system of a digital multi-function machine according to an embodiment of the present invention.

FIG. 14 is a block diagram showing the structure of the control system of a digital multi-function machine according to this embodiment. The same components as in Embodiment 1 are designated with the same reference codes, and the explanation thereof is omitted. In addition to the digital multi-function machine 1*a* illustrated in Embodiment 1, the digital multi-function machine 1*b* according to Embodiment 5 comprises an encryption circuit 23 for encrypting the received data, and a decryption circuit 24 for decrypting the encrypted data.

Note that, in this embodiment, although the encryption and decryption of data are processed by the hardware, it may also be possible to encrypt and decrypt data by storing a computer program for encrypting data and a computer program for decrypting data in the ROM 13 and causing the CPU 11 to load and execute these computer programs when the need arises.

Figure 15:
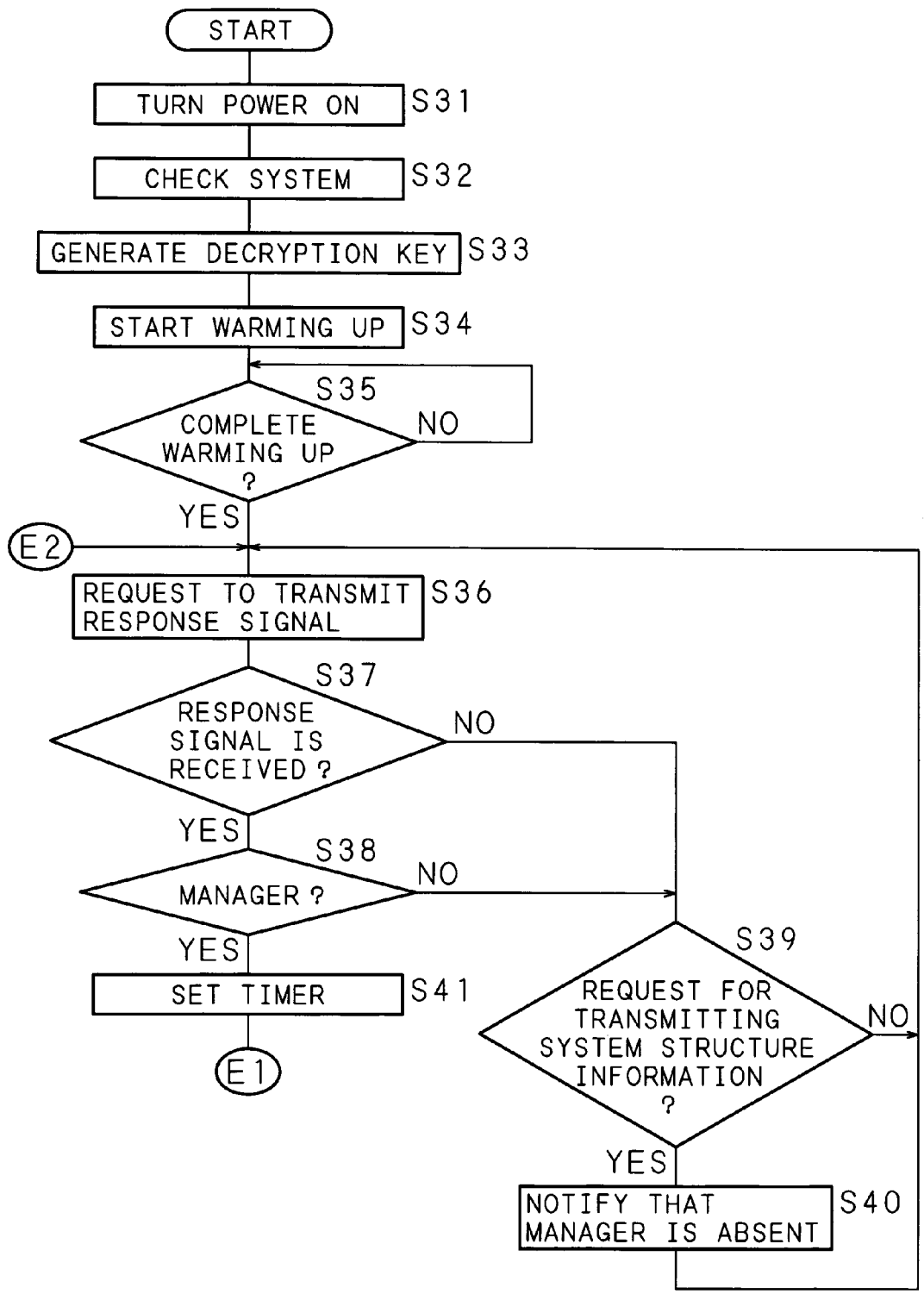
FIG. 15 is a flowchart for explaining the processing steps performed by the digital multi-function machine.
Figure 16:
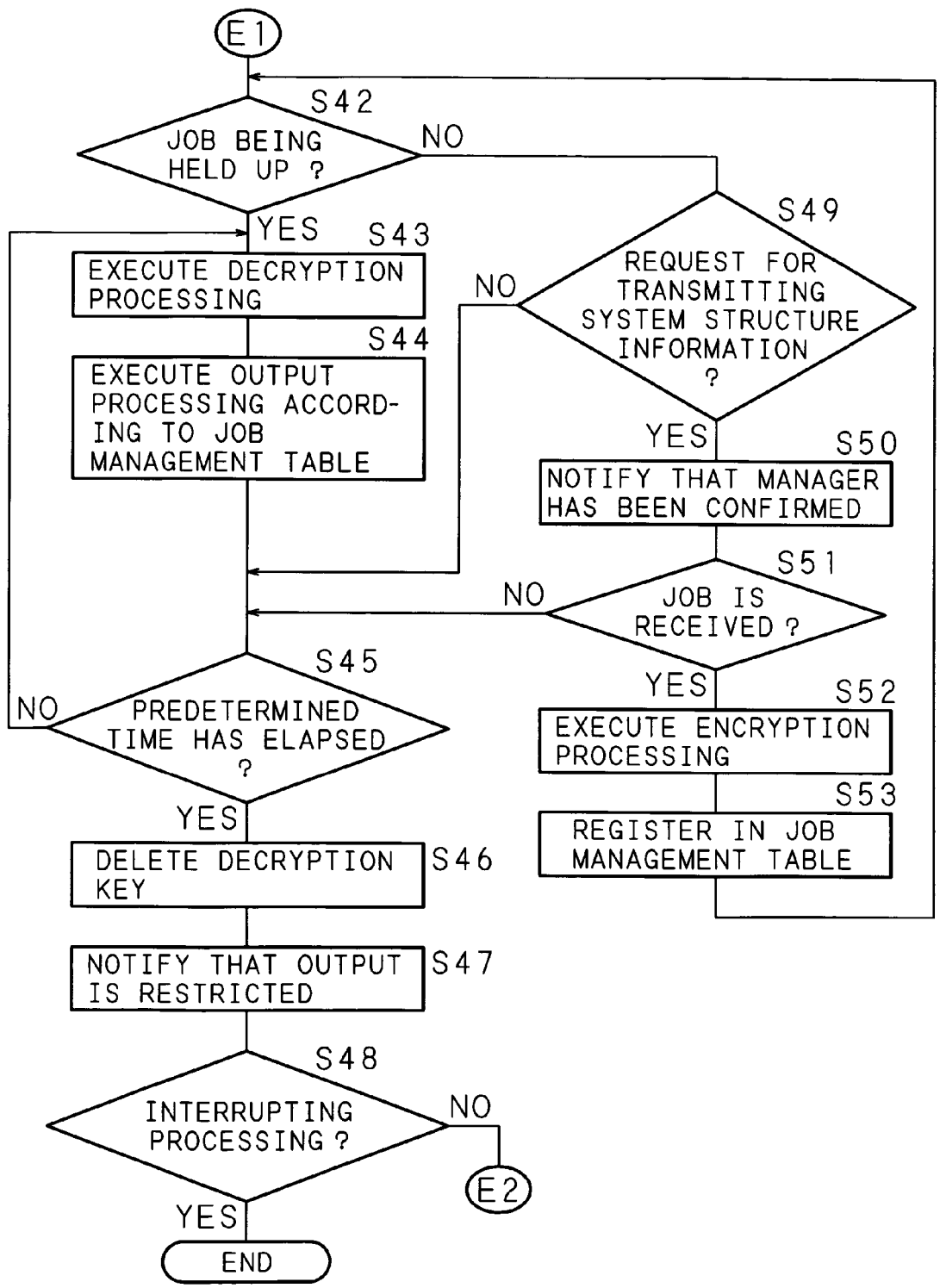
FIG. 16 is a flowchart for explaining the processing steps performed by the digital multi-function machine.

FIG. 15 and FIG. 16 are flowcharts showing the processing steps performed by the digital multi-function machine 1*b*. When the power of the digital multi-function machine 1*b* is turned on (step S31), the CPU 11 checks the system based on the information stored in the system management table 14*a* in the management unit 14 (step S32). More specifically, the CPU 11 communicates with the respective hardware devices connected thereto through the bus 12, obtains information about the operating state of the respective devices, and performs the process of registering the obtained information in the system management table 14*a*. Note that the operating state of the respective hardware devices is always monitored by the CPU 11 as described above, and the contents of the system management table 14*a* are updated whenever a change is made. Next, the CPU 11 generates a decryption key for decrypting the data encrypted by the encryption circuit 23 (step S33), and stores the decryption key in a predetermined storage area in the management unit 14. Then, the CPU 11 starts warming up the image forming unit 17, etc. (step S34), and determines whether or not a warm-up has been performed completely with reference to the contents of the system management table 14*a* (step S35). When it is determined that the warm-up has not been performed completely (S35: NO), the CPU 11 waits until the warm-up is performed completely.

When it is determined that the warm-up has been performed completely (S35: YES), the CPU 11 transmits a request signal requesting a response from the ID card through the wireless communication IF 22 so as to request the ID card to transmit a response signal (step S36). Next, the CPU 11 monitors the wireless communication IF 22 and determines whether or not the response signal transmitted from the ID card in response to the transmission request is received (step S37). When it is determined that the response signal is received (S37: YES), the CPU 11 obtains the data contained in the received response signal and compares the obtained data with the data identifying the manager, which is stored in a predetermined storage area in the ROM 13, so as to determine whether or not the data identifying the manager is received (step S38).

When it is determined at step S37 that the response signal is not received by the wireless communication IF 22 (S37: NO), or when it is determined at step S38 that the data identifying the manager is not contained in the response signal (S38: NO), the CPU 11 determines whether or not a request for transmitting the system structure information is received from the information processing device 2 via the communication network N1 (step S39). In other words, it is determined whether or not the printer driver preinstalled in the information processing device 2 is activated and the transmission of the system structure information is required by an access request through the printer driver. When it is determined that a request for transmitting the system structure information is not received (S39: NO), processing is returned to step S36. On the other hand, when it is determined that a request for transmitting the system structure information is received (S39: YES), the CPU 11 transmits the system structure information to the information processing device 2 requesting the information, and gives a notification indicating that the manager is absent (step S40). Then, processing is returned to step S36.

When it is determined at step S38 that the data identifying the manager is received (S38: YES), the CPU 11 sets the timer (not shown) (step S41), and determines whether or not there is a job being held up with reference to the job management table 14*b* in the management unit 14 (step S42). When it is determined that there is no job being held up (S42: NO), the CPU 11 determines whether or not a request for transmitting the system structure information is made by any information processing device 2 connected through the communication network N1 (step S49). When it is determined that a request for transmitting the system structure information is made (S49: YES), the CPU 11 gives a notification indicating that the manager has been confirmed to the information processing device 2 that made the request (step S50). The information processing device 2 that received this notification displays the content of the notification on the print setting screen 200 outputted by the printer driver (see, for example, FIG. 6A). Next, the CPU 11 monitors the communication IF 18 and determines whether or not a job is received (step S51). When it is determined that a job is received (S51: YES), the CPU 11 executes encryption processing by transferring the received job to the encryption circuit 23 (step S52). The encrypted job is stored in a suitable data storage area in the HDD device 21, and the information indicating receipt of the job is registered in the job management table 14*b* (step S53). Then, processing is moved to step S42.

On the other hand, when it is determined at step S42 that there is a job being held up (S42: YES), the CPU 11 performs decryption processing by reading the encrypted data from the data storage area in the HDD device according to the job management table 14*b* and transferring the read data to the decryption circuit 24 together with the decryption key stored in the predetermined storage area in the management unit 14 (step S43). Then, the CPU 11 executes the output processing for the data decrypted according to the job management table 14*b* (step S44). In other words, if the job registered in the job management table 14*b* specifies print processing, the CPU 11 transfers the image data for printing, which is obtained by developing the job, to the image forming unit 17 and executes print processing as the output processing. If the job registered in the job management table 14*b* specifies reading of data using the document filing function, the CPU 11 executes the output processing by transmitting the specified data to the information processing device 2 that made the request.

When the output processing is executed according to the job management table 14*b* (S44), when it is determined at step S49 that a request for transmitting the system structure information is not made (S49: NO), or when it is determined at step S51 that a job is not received (S51: NO), the CPU 11 determines, based on the time outputted by the timer, whether or not a predetermined time has elapsed since the timer was set (step S45). When it is determined that the predetermined time has not elapsed (S45: NO), processing is returned to step S43 to continue the output processing for the job being held up. On the other hand, when it is determined that the predetermined time has elapsed (S45: YES), the CPU 11 deletes the decryption key stored in the management unit 14 (step S46), and then gives a notification indicating that outputting is restricted (step S47). The notification indicating that outputting is restricted is given by displaying it on the display unit 15*b* of the operating panel 15 of the digital multi-function machine 1*b* and transmitting the data to all information processing devices 2 connected through the communication network N1. Moreover, even when it is determined that access is made through the printer driver preinstalled in the information processing device 2 in the same manner as above, the CPU 11 gives a notification indicating that output processing cannot be executed because the manager is absent (see, for example, FIG. 5B). After the CPU 11 of the digital multi-function machine 1*b* gives the notification indicating that outputting is restricted, it actually restricts (prohibits) the output processing by stopping the print processing performed by the image forming unit 17, the transmission of data from the communication IF 18, and the transmission of facsimile data from the facsimile communication IF 19.

Next, the CPU 11 determines whether or not there is interrupting processing due to resetting of the entire system of the digital multi-function machine 1*b* (step S48). When it is determined that there is no interruption (S48: NO), processing is returned to step S36. On the other hand, when it is determined that there is interrupting processing (S48: YES), processing of this routine is finished.

Note that, in this embodiment, although the presence or absence of the manager is confirmed through wireless communication by using the ID card 5 of the manager, it may also be possible to directly confirm the presence or absence of the manager through the operating panel 15 in the same manner as in Embodiment 3, or indirectly confirm the presence or absence of the manager by identifying the device used by the manager via the communication network N1 in the same manner as in Embodiment 4. Further, it may also be possible to restrict only the output processing from a preset output channel in the same manner as in Embodiment 2.

In the processing explained in FIG. 15 and FIG. 16, the decryption key is generated when the system check performed after turning on the power is completed, and the generated decryption key is deleted when a predetermined time has elapsed since the confirmation of the presence of the manager. Therefore, even when the presence of the manager is confirmed again after deletion of the decryption key, decryption of the data can not be performed. Hence, in this embodiment, the ID card 5 of the manager is provided with data about the decryption key, and the data about the decryption key is transmitted as a response signal together with the data identifying the manager when responding to the request signal from the digital multi-function machine 1*b*.

Figure 17:
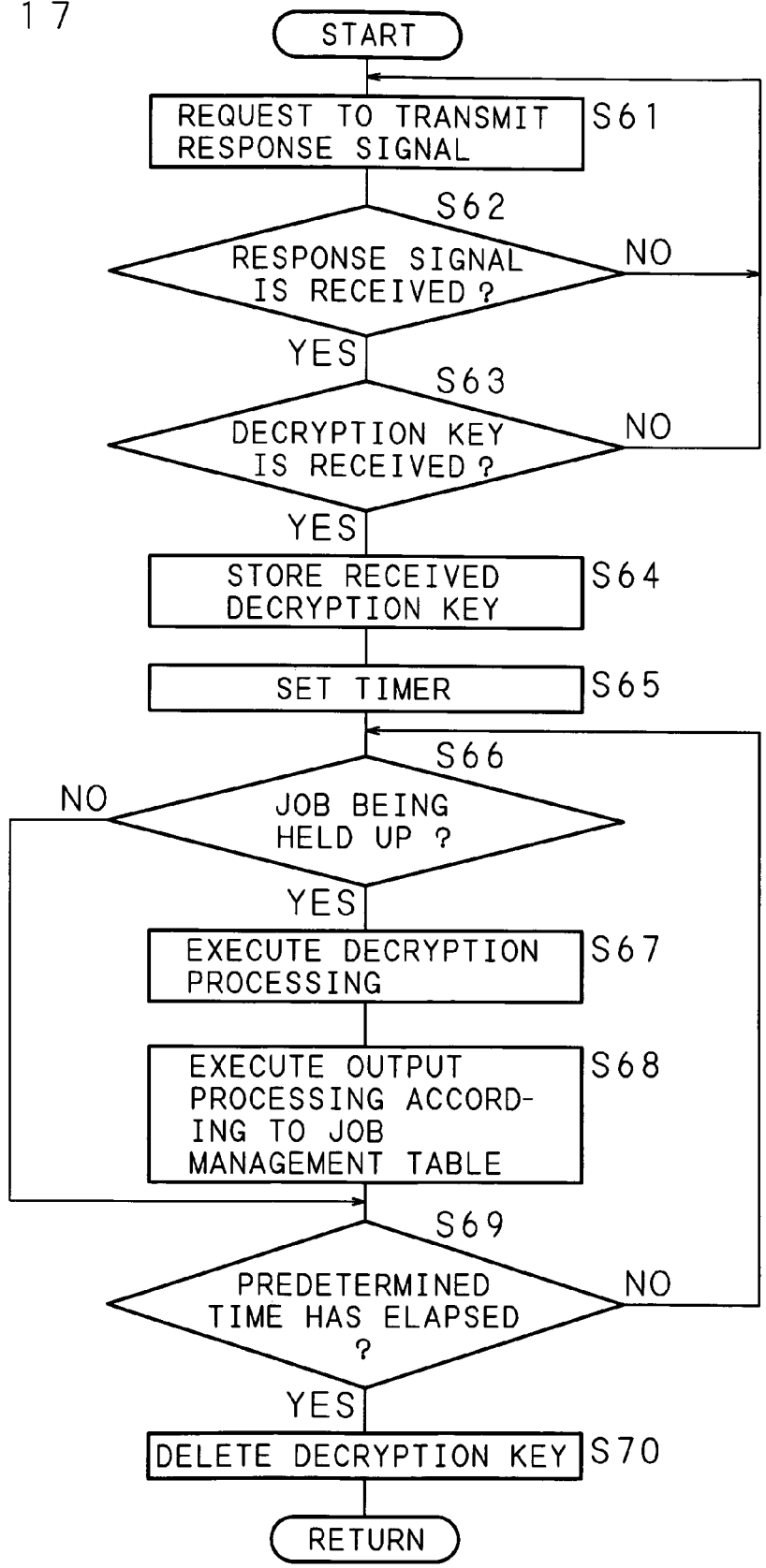
FIG. 17 is a flowchart for explaining processing to be executed by the digital multi-function machine when a decryption key is received from an external device.

FIG. 17 is a flowchart for explaining processing to be executed by the digital multi-function machine 1*b* when a decryption key is received from an external device. In order to request the decryption key, the CPU 11 of the digital multi-function machine 1*b* requests the ID card to transmit a response signal by transmitting a request signal requesting a response from the ID card through the wireless communication IF 22 (step S61). Next, the CPU 11 monitors the wireless communication IF 22 and determines whether or not the response signal transmitted from the ID card in response to the transmission request is received (step S62). When it is determined that the response signal is received (S62: YES), the CPU 11 obtains the data contained in the received response signal, and determines, based on the obtained data, whether or not the decryption key is received (step S63). When it is determined that the response signal is not received (S62: NO), or when it is determined that the decryption key is not present in the data contained in the received response signal (S63: NO), processing is returned to step S61.

When it is determined that the data about the decryption key is contained in the response signal transmitted from the ID card (S63: YES), the CPU 11 stores the received decryption key in a predetermined storage area in the management unit 14 (step S64). Next, the CPU 11 sets the timer (not shown) (step S65), and determines whether or not there is a job being held up with reference to the job management table 14*b* in the management unit 14 (step S66). When it is determined that there is a job being held up (S66: YES), the CPU 11 executes the decryption processing by reading the encrypted data from the data storage area in the HDD device 21 and transferring the read data to the decryption circuit 24 together with the decryption key stored in the predetermined storage area in the management unit 14, according to the job management table 14*b* (step S67). Then, the CPU 11 executes the output processing for the decrypted data according to the job management table 14*b* (step S68). In other words, if the job registered in the job management table 14*b* specifies print processing, the CPU 11 transfers the image data for printing, which is obtained by developing the job, to the image forming unit 17 and executes print processing as the output processing. If the job registered in the job management table 14*b* specifies reading of data using the document filing function, the CPU 11 executes the output processing by transmitting the specified data to the information processing device 2 that made the request.

Then, when the output processing is executed (S68), or when it is determined at step S66 that there is no job being held up (S66: NO), the CPU 11 determines whether or not a predetermined time has elapsed since the timer was set (step S69). When it is determined that the predetermined time has not elapsed (S69: NO), processing is returned to step S66. On the other hand, when it is determined that the predetermined time has elapsed (S69: YES), the decryption key stored in the predetermined storage area in the management unit 14 is deleted (step S70) and processing of this routine is finished.

Thus, in this embodiment, since the job being held up at the time the decryption key is received from an external device is automatically processed, it is not necessary to ask the user to perform a special operation, thereby improving convenience.

Note that, in the respective embodiments, when a request for accessing the digital multi-function machine 1*a* (1*b*) is made through the printer driver, the information indicating the presence or absence of the manager and the information indicating whether or not the use of the digital multi-function machine 1*a* (1*b*) is permitted are transmitted to the device that made the request, but it may also be possible to give the information to all information processing devices 2 connected to the communication network N1 in a broadcast manner.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data output apparatus comprising:
a controller capable of performing operations of:
receiving data to be output;
storing the received data to be output in a data storing means;
outputting the received data to be output from the data storing means;
encrypting the received data to be output;

storing the encrypted data in the data storing means;
generating a decryption key for decrypting the encrypted data;
storing the generated decryption key in decryption key storing means;
transmitting the decryption key to an identification card which is carried by a manager of the data output apparatus and in which identification information identifying the manager is stored, and storing the decryption key in the identification card;
determining whether or not the identification information transmitted from the identification card is received;
decrypting the encrypted data using the decryption key stored in the decryption key storing means and permitting output processing based on the decrypted data, until a predetermined time has elaspsed since it was determined that the identification information was received;
deleting the decryption key stored in the decryption key storing means when the predetermined time has elapsed;
determining whether or not the decryption key transmitted with the identification information is received from the identification card after the decryption key is deleted;
storing the decryption key received from the identification card in the decryption key storing means;
decrypting the encrypted data using the decryption key stored in the decryption key storing means and permitting output processing based on the decrypted data, until a predetermined time has elapsed since the decryption key was stored; and
deleting the decryption key received from the identification card when the predetermined time has elapsed.

2. The data output apparatus according to claim 1, wherein said controller is further capable of performing operations of:
transmitting information requesting the decryption key for decrypting the data to an external device; and
receiving the decryption key transmitted in response to the request,
wherein the received decryption key is stored.

3. The data output apparatus according to claim 1, wherein said controller is further capable of performing an operation of
determining whether or not the encrypted data is stored in the data storing means,
wherein if the decryption key is stored in the decryption key storing means when it is determined that the encrypted data is stored in the data storing means, decryption of the data is started.

4. The data output apparatus according to claim 1, wherein said controller is further capable of performing operations of:
transmitting a transmission request for the identification information identifying the manager to an external device; and
receiving the identification information transmitted in response to the transmission request.

5. The data output apparatus according to claim 1, wherein the operation of outputting the received data includes a process of transmitting the data to an external device.

6. The data output apparatus according to claim 1, wherein said controller is further capable of performing an operation of notifying whether or not the outputting of data is permitted.

7. The data output apparatus according to claim 1, wherein said controller is further capable of performing an operation of outputting the received data regardless of whether or not the identification information identifying the manager is received.

8. A data output apparatus comprising:
means for receiving data to be output;
data storing means for storing the received data to be outputted;
first output means for outputting the stored data;
means for encrypting the received data;
means for storing the encrypted data in the data storing means;
means for generating a decryption key for decrypting the encrypted data;
decryption key storing means for storing the generated decryption key;
means for transmitting the decryption key to an identification card which is carried by a manager of the data output apparatus and in which identification information identifying the manager is stored, and storing the decryption key in the identification card;
means for determining whether or not the identification information transmitted from the identification card is received;
means for decrypting the encrypted data using the decryption key stored in the decryption key storing means and permitting output processing based on the decrypted data, until a predetermined time elapses since it is determined that the identification information is received;
means for deleting the decryption key stored in the decryption key storing means when the predetermined time has elapsed;
means for determining whether or not the decryption key transmitted with the identification information is received from the identification card after the decryption key is deleted;
means for storing the decryption key received from the identification card in the decryption key storing means;
means for decrypting the encrypted data using the decryption key stored in the decryption key storing means and permitting output processing based on the decrypted data, until a predetermined time has elapsed since the decryption key was stored; and
means for deleting the decryption key received from the identification card when the predetermined time has elapsed.

9. The data output apparatus according to claim 8, further comprising:
means for transmitting information requesting the decryption key for decrypting the data to an external device; and
means for receiving the decryption key transmitted in response to the request,
wherein the received decryption key is stored.

10. The data output apparatus according to claim 8, further comprising
means for determining whether or not the encrypted data is stored in the data storage means,
wherein if the decryption key is stored in the decryption key storage means when it is determined that the encrypted data is stored in the data storing means, decryption of the data is started.

11. The data output apparatus according to claim 8, further comprising:

means for transmitting a transmission request for the identification information identifying the manager to an external device; and means for receiving the identification information transmitted in response to the transmission request.

12. The data output apparatus according to claim 8, wherein the first output means is means for transmitting data to an external device.

13. The data output apparatus according to claim 8, further comprising means for notifying whether or not the outputting of data by the first output means is permitted.

14. The data output apparatus according to claim 8, further comprising second output means for outputting data, which is different from the first output means, wherein the outputting of data from the second output means is allowed regardless of whether or not the identification information identifying the manager is received.

15. The data output apparatus according to claim 1, wherein said controller is further capable of prohibiting the outputting of the data stored in the data storing means from the first output means when the predetermined time has elapsed since it was determined that the identification information was received, or when the predetermined time has elapsed since the decryption key was stored.

16. The data output apparatus according to claim 1, wherein said controller is further capable of when it is determined that the identification information identifying the manager is received, determining whether or not data to be outputted is stored in the data storage means, wherein when it is determined that the data to be outputted is stored in the data storage means, outputting of the data is started.

17. The data output apparatus according to claim 8, further comprising:

means for prohibiting the outputting of the data stored in the data storing means from the first output means when the predetermined time has elapsed since it was determined that the identification information was received, or when the predetermined time has elapsed since the decryption key was stored.

18. The data output apparatus according to claim 8, further comprising:

means for, when it is determined that the identification information identifying the manager is received, determining whether or not data to be outputted is stored in the data storage means, wherein when it is determined that the data to be outputted is stored in the data storage means, outputting of the data is started.

* * * * *